(12) United States Patent
Nolasco

(10) Patent No.: US 7,153,082 B2
(45) Date of Patent: *Dec. 26, 2006

(54) WHEEL LIFT WITH LATERALLY MOVABLE, ROTATABLE SWIVEL ARM WHEEL SCOOPS

(75) Inventor: Pablo Nolasco, Corona, NY (US)

(73) Assignee: Autolift Technologies, Inc., Bay Shore, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/281,508

(22) Filed: Oct. 28, 2002

(65) Prior Publication Data

US 2003/0082038 A1    May 1, 2003

Related U.S. Application Data

(60) Provisional application No. 60/347,819, filed on Oct. 29, 2001.

(51) Int. Cl.
*B60P 3/12* (2006.01)
*B60B 29/00* (2006.01)

(52) U.S. Cl. ............. 414/563; 414/426; 414/800; 280/402

(58) Field of Classification Search ........ 414/563, 414/426, 430, 785, 911, 800, 918; 280/402; 254/3 B, 3 R, 108
See application file for complete search history.

(56) References Cited

U.S. PATENT DOCUMENTS

| | | |
|---|---|---|
| 3,434,607 A | 3/1969 | Nelson |
| 3,434,608 A | 3/1969 | Nelson |
| 3,620,393 A | 11/1971 | Bubik |
| 3,667,630 A | 6/1972 | Scott |
| 3,719,294 A | 3/1973 | Aquilla |
| 4,034,873 A | 7/1977 | Haring |
| 4,149,643 A | 4/1979 | Skala .................. 414/563 |
| 4,239,275 A | 12/1980 | Horneys et al. ........ 414/478 |
| 4,368,002 A | 1/1983 | Krzyzosiak, Jr. ........ 414/494 |
| 4,383,807 A | 5/1983 | Bubik .................. 414/563 |
| 4,384,817 A | 5/1983 | Peterson ............... 414/563 |
| 4,451,193 A | 5/1984 | Cannon, Jr. et al. ..... 414/563 |
| 4,473,237 A | 9/1984 | Lind ................... 280/402 |
| 4,473,334 A * | 9/1984 | Brown ................. 414/563 |
| 4,534,579 A | 8/1985 | Shackleford, Sr. ...... 280/402 |
| 4,557,496 A | 12/1985 | Sill .................... 280/402 |
| 4,564,207 A | 1/1986 | Russ ................... 280/402 |

(Continued)

FOREIGN PATENT DOCUMENTS

JP         200147931      *   2/2001

Primary Examiner—Eileen D. Lillis
Assistant Examiner—Michael Lowe
(74) Attorney, Agent, or Firm—Alfred M. Walker

(57) ABSTRACT

Wheel lift tow device for a tow truck includes a centrally located extendable support beam having a cross bar pivotably attached to it, so that it can be oriented obliquely for towing obliquely placed disabled cars, especially for front wheel drive vehicles. The telescoping slider arms of the cross bar provide lateral movement for a pair of swivel arm scoops, or claws, which cradle and lift a pair of wheels of the disabled vehicle. The swivel arm scoops are rotatable about a pivot on each telescoping slider arm, but in their position of use are supported by a lateral stop bracket, which supports the lateral forces of the wheel while in the cradled position and distributes the weight therefrom. The swivel arm scoop claws are configured to isolate the front end parts from the moving parts of the wheel lift.

16 Claims, 19 Drawing Sheets

U.S. PATENT DOCUMENTS

| | | | |
|---|---|---|---|
| 4,573,857 A | 3/1986 | Porter, Sr. et al. | 414/563 |
| 4,586,866 A | 5/1986 | Kvamme | 414/563 |
| 4,632,629 A | 12/1986 | Kooima | 414/563 |
| 4,637,623 A | 1/1987 | Bubik | 280/402 |
| 4,678,392 A | 7/1987 | Capers et al. | 414/563 |
| 4,679,978 A | 7/1987 | Holmes et al. | 414/563 |
| 4,712,967 A | 12/1987 | Farthing | 414/563 |
| 4,741,661 A | 5/1988 | Carey | 414/563 |
| 4,795,303 A | 1/1989 | Bubik | 414/478 |
| 4,797,057 A * | 1/1989 | Shoup | 414/563 |
| 4,797,058 A | 1/1989 | Bilas | 414/563 |
| 4,798,509 A | 1/1989 | Bubik | 414/563 |
| 4,815,915 A | 3/1989 | Crupi | 414/563 |
| 4,836,737 A | 6/1989 | Holmes et al. | 414/563 |
| 4,871,291 A | 10/1989 | Moore et al. | 414/563 |
| 4,904,146 A | 2/1990 | Lock et al. | 414/563 |
| 4,927,315 A | 5/1990 | Nespor | 414/563 |
| 4,929,142 A | 5/1990 | Nespor | 414/563 |
| D310,980 S | 10/1990 | Bubik | 12/14 |
| 4,986,720 A | 1/1991 | Holmes et al. | 414/563 |
| 5,061,147 A | 10/1991 | Nespor | 414/563 |
| 5,133,633 A | 7/1992 | Grata | 414/477 |
| 5,205,700 A | 4/1993 | Lin et al. | 414/540 |
| 5,236,214 A | 8/1993 | Taylor | 280/402 |
| 5,326,216 A | 7/1994 | Russ | 414/563 |
| 5,350,271 A * | 9/1994 | Weller | 414/563 |
| 5,352,083 A | 10/1994 | Roberts et al. | 414/477 |
| 5,354,167 A | 10/1994 | Cullum et al. | 414/563 |
| 5,391,044 A | 2/1995 | Young | 414/563 |
| 5,518,260 A | 5/1996 | Grignon | 280/402 |
| 5,560,628 A | 10/1996 | Horn | 280/402 |
| 5,575,606 A | 11/1996 | Kiefer et al. | 414/563 |
| 5,575,608 A * | 11/1996 | Yau et al. | 414/607 |
| 5,607,279 A | 3/1997 | Hill et al. | 414/478 |
| 5,628,609 A | 5/1997 | Nespor | |
| 5,672,042 A | 9/1997 | Bartel | 414/563 |
| 5,692,871 A | 12/1997 | Nespor | 414/563 |
| 5,722,810 A * | 3/1998 | Young et al. | 414/563 |
| 5,762,465 A * | 6/1998 | Zackovich | 414/563 |
| 5,908,280 A | 6/1999 | Allison | 414/563 |
| 6,123,496 A * | 9/2000 | Alexander | 414/401 |
| 6,139,250 A * | 10/2000 | Nolasco | 414/563 |

* cited by examiner

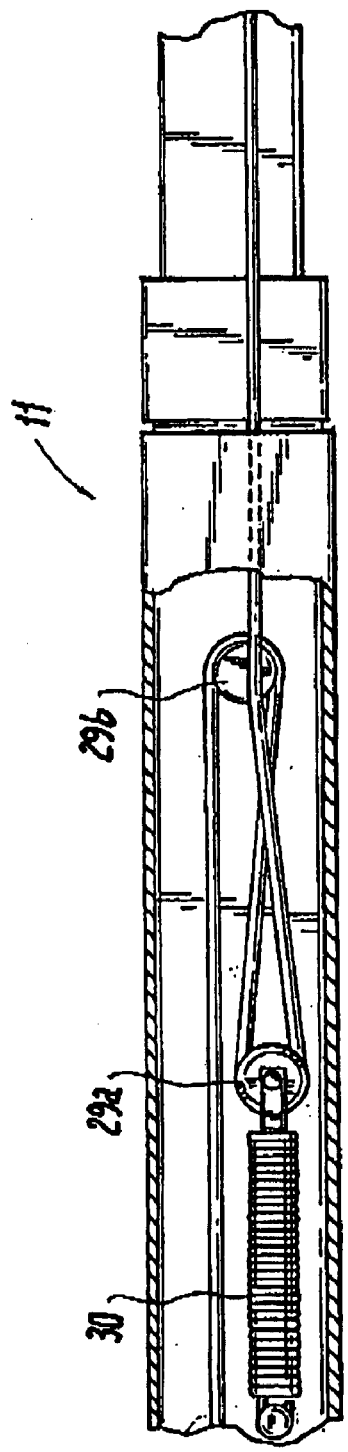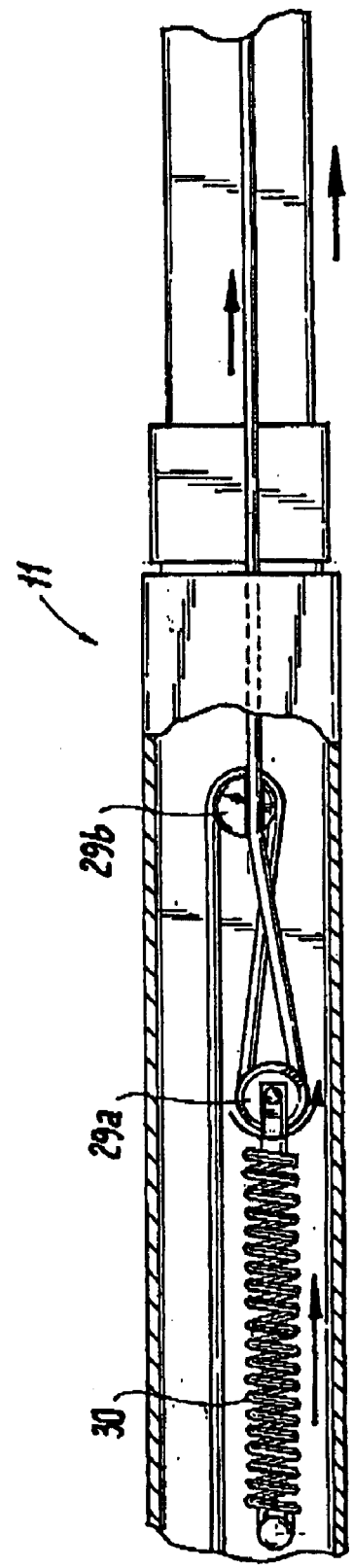

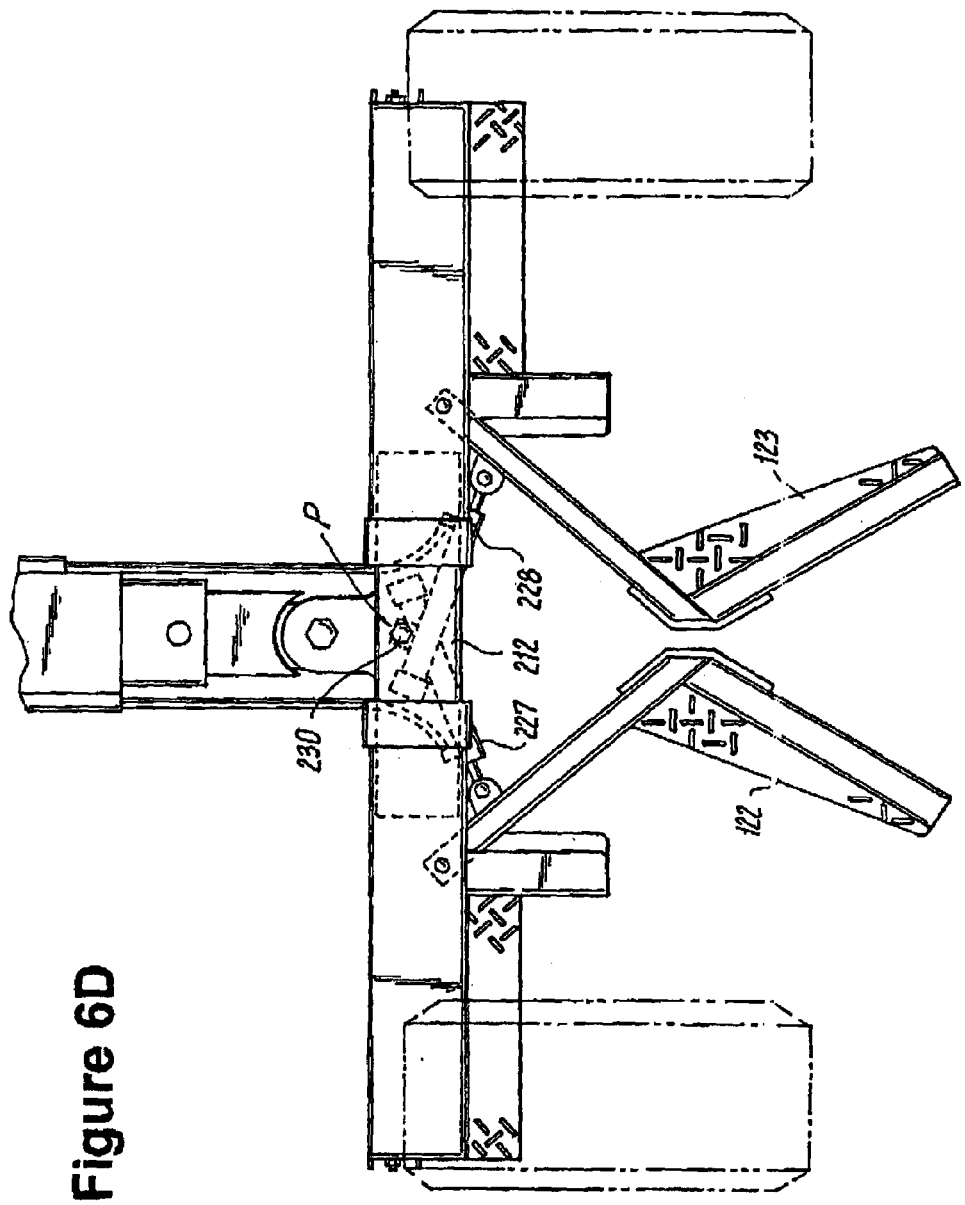

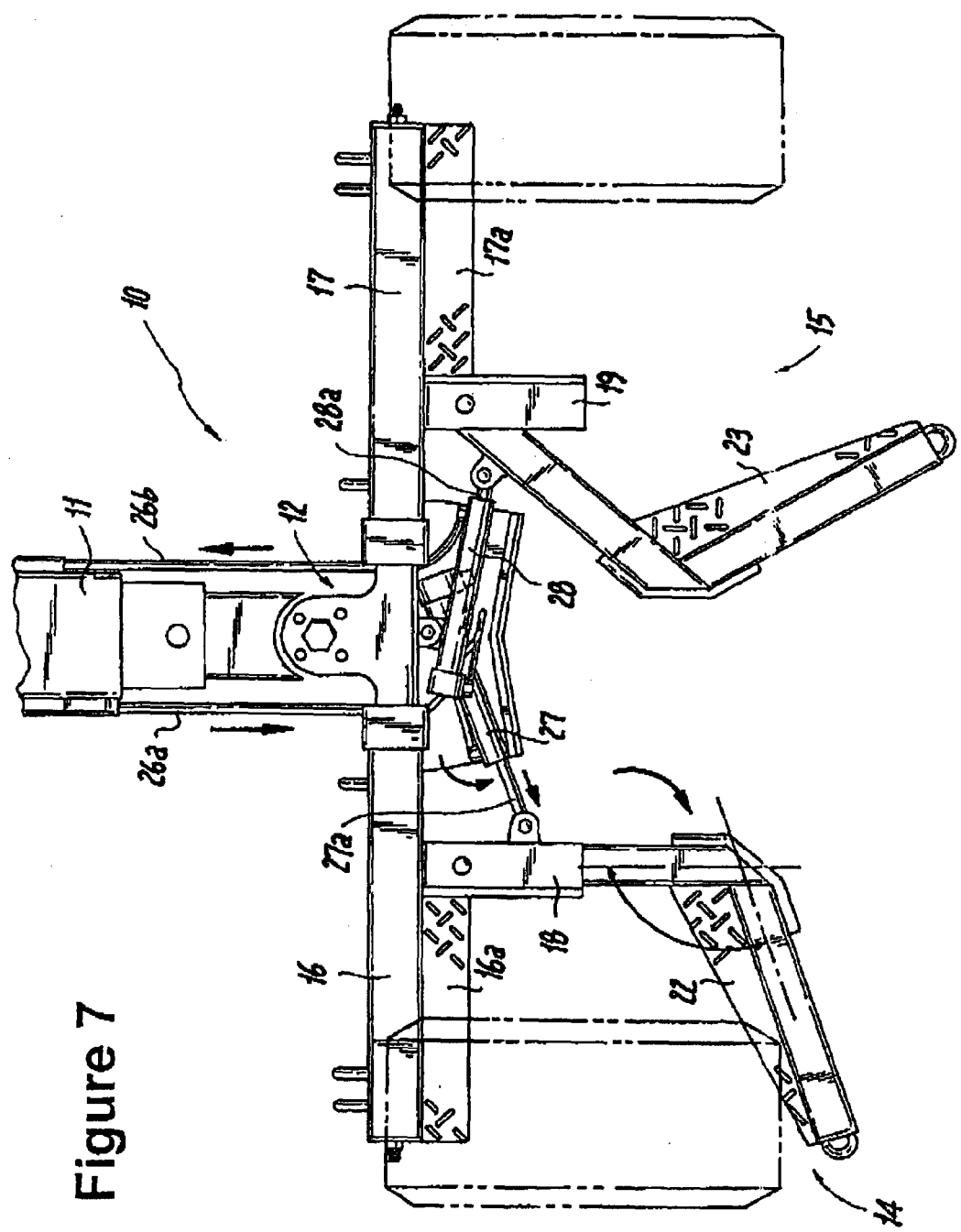

Figure 14
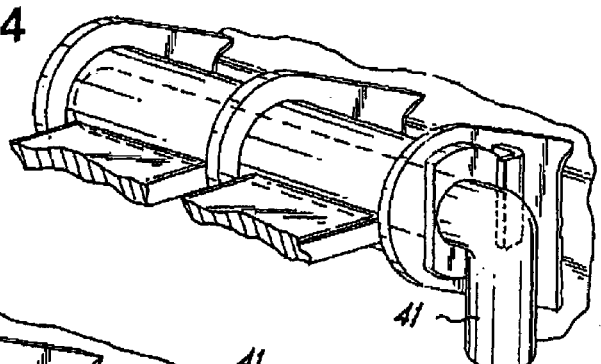
Figure 15
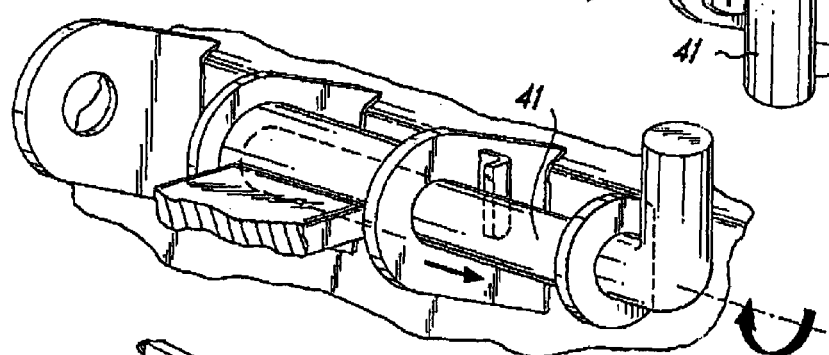
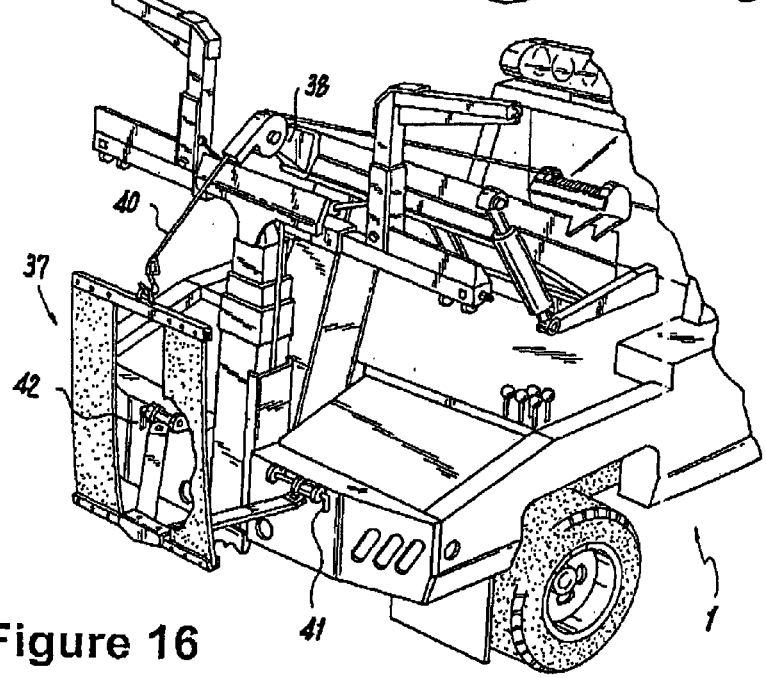
Figure 16

WHEEL LIFT WITH LATERALLY MOVABLE, ROTATABLE SWIVEL ARM WHEEL SCOOPS

RELATED APPLICATIONS

This application is based in part upon my provisional patent application Ser. No. 60/347,819, filed Oct. 29, 2001.

FIELD OF THE INVENTION

The present invention provides improvements to the subject matter of my earlier U.S. Pat. No. 6,139,250, which encompasses a wheel lift for towing vehicles, wherein the wheels are lifted by a pair of laterally movable and rotatable swivel arm scoops, or claws, as is known in the trade.

BACKGROUND OF THE INVENTION

Motor vehicles, especially front wheel drive automobiles, present problems when being towed. For example, much of the drive machinery and reservoirs are in the front of the vehicle, close to the axle of the front wheels being lifted for towing.

The conventional technology either uses lateral movement of manually engageable claw arms, such as manufactured by Hy-Tech (also known as Hydra-Tech) or uses rotatable swivel arm claws, such as manufactured by Dynamic International Vulcan Equipment Co, Inc., and Jerr-Dan Corporation.

Other prior art includes U.S. Pat. No. 4,564,207 of Russ, dated Jan. 14, 1986, which describes a wheel lift device with rotatable L-shaped swivel arm claws, such as manufactured by Dynamic International, Inc. of Norfolk, Va. Furthermore, U.S. Pat. No. 5,326,216 also of Russ describes a swivelable wheel scoop, as does U.S. Pat. No. 5,722,810 of Young, et al, assigned to Jerr-Dan Corp.

In Russ '207, Russ '626, and Young et al '810, the cross beam does not move laterally perpendicular to the axis of the support beam extending out from the back of the tow truck. Moreover, the swivel arm claws are not tapered to be adjustable for various wheel base widths or for various sized vehicle tires. While the swivel arm claws are pivotable, the piston guiding the swivel arm claw pivoting moves parallel to the axis of the transverse cross bar.

Moreover, U.S. Pat. No. 4,473,334 of Brown describes rotatable wheel lift claws, similar to those of Dynamic or Century Wreckers.

U.S. Pat. No. 5,692,871 of Nespor, dated Dec. 2, 1997, and assigned to Chevron, Inc. describes a chain movable rotatable swivel arm scoop, wherein the tires of the vehicle are held adjacent to the proximal portion of the swivel arm scoop adjacent to the cross beam. In Nespor '871 the chain moves about a sprocket, and the swivel arm scoops do not move laterally outward and inward parallel to the axis of the cross beam. Nespor '871 does not provide an auxiliary brace to distribute the heavy weight of a towed vehicle against the pivotable swivel arm scoop.

U.S. Pat. No. 4,929,142 of Nespor describes a tilting vehicle carrier, U.S. Pat. No. 5,061,147 also of Nespor describes a wheel lift brace, U.S. Pat. No. 4,927,315 also of Nespor describes a boom retracting device for a wheel lift and U.S. Pat. No. 5,628,609 also of Nespor shows manually rotatable L-shaped wheel scoops attached to a transverse cross beam.

U.S. Pat. No. 4,836,737 of Holmes describes a wheel lift tow assembly with manually insertable L-shaped wheel scoops, U.S. Pat. No. 4,986,720 also of Holmes describes quick connect wheel cradles with a safety feature to prevent dislodging during towing of a disabled vehicle, and U.S. Pat. No. 4,679,978 also of Holmes, also describes a wheel lift tow assembly with manually insertable L-shaped wheel scoops.

Other Patents include U.S. Pat. No. 4,871,291 of Moore for a wheel lift with manual arm scoops and U.S. Pat. No. 4,904,146 of Lock also for a wheel lift with manual arm scoops.

U.S. Pat. No. 3,620,393 of Bubik describes a tow bar assembly, U.S. Pat. No. 4,637,623 also of Bubik discloses a wheel lift, U.S. Pat. No. 4,795,303 also of Bubik describes a wheel lift which cradles wheels from below, U.S. Pat. No. 4,383,807 also of Bubik discloses a wheel lift sling assembly, U.S. Pat. No. 4,798,509 also of Bubik describes rotatable swivel arm scoops and U.S. Pat. No. 5,354,167 of Callum discloses underlift mechanisms. Design Patent No. Des. 310,980 describes the exterior design of a towing vehicle body.

Further patents include U.S. Pat. No. 5,133,633 of Grabba for a flat bed tow truck, U.S. Pat. No. 5,672,042 of Bartel, which describes a wheel lift assembly, U.S. Pat. No. 4,239,275 of Horneys for a multi-vehicle tow truck, and U.S. Pat. No. 5,575,606 of Kiefer which describes a wheel lift with apparently manually rotatable scoop arms.

U.S. Pat. No. 4,678,392 of Capers describes a wheel lift with wheel scoops which respond to movement of the wheel upon contact.

U.S. Pat. No. 5,518,260 of Grignon discloses a wheel lift with movable jaws, but wherein the vehicle is movable for a short distance within a garage upon rollers.

U.S. Pat. No. 4,573,857 of Porter describes a wheel lift with lockable wheel support members.

U.S. Pat. No. 4,712,967 discloses a dolly type car carrier and U.S. Pat. No. 4,586,866 of Kvamme, describes a wheel lift with manual wheel supports.

U.S. Pat. No. 4,741,661 of Carey describes manual L-shaped scoop assemblies, U.S. Pat. No. 5,236,214 of Taylor describes improvements to the boom of an underlift assembly, U.S. Pat. No. 4,451,193 of Cannon discloses a boom supported wheel lift carrier, U.S. Pat. No. 5,560,628 of Horn describes a vertically movable towing assembly and U.S. Pat. No. 5,205,700 of Lin describes a hoist mechanism for a vehicle carrier.

Other patents include U.S. Pat. No. 5,350,271 of Weller for a wheel lift with swivel arm scoops which are rotatable by the force of cylinders and levers. In Weller '271 the swivel arm scoops are not laterally movable. Moreover, each swivel arm scoop is L-shaped but with no taper to accommodate various wheel sizes. In addition, in a position of rest the cross beam with the swivel arm scoops thereon sticks out from the end of the tow truck, which is a safety hazard.

U.S. Pat. No. 5,391,044 of Young describes a wheel lift with non-rotatable L-shaped wheel scoops, U.S. Pat. No. 5,352,083 of Roberts describes a wheel lift with non-rotatable L-shaped scoops having swivelable tire engaging portions, U.S. Pat. No. 4,384,817 of Peterson describes a frame mounted vehicle lift assembly and U.S. Pat. No. 4,797,058 of Bilas describes a wheel lift assembly.

Furthermore, U.S. Pat. No. 4,632,629 of Kooima describes a wheel lift with laterally movable but otherwise stationary U-shaped wheel scoop jaws. U.S. Pat. No. 4,557,496 of Sill, also describes a wheel lift with laterally movable but otherwise stationary U-shaped wheel scoop jaws, and U.S. Pat. No. 4,534,579 of Shackleford discloses a wheel lift assembly with pivotable wheel engaging fork members.

U.S. Pat. No. 4,473,237 of Lind discloses a wheel lift which includes square shaped members which have to be inserted under the wheels when the vehicle frame is first lifted otherwise.

In addition U.S. Pat. No. 4,034,873 of Haring describes a sling apparatus with manually installable wheel cradle scoops, U.S. Pat. No. 3,667,630 of Scott discloses a vehicle tow assembly with lockable wheel engaging members, U.S. Pat. No. 3,719,294 of Aquilla describes a vehicle tow assembly, U.S. Pat. No. 4,149,643 of Skala describes a truck tow lift which engages the truck frame, U.S. Pat. No. 5,607,279 of Hill describes a flat bed tow truck with a hoist mechanism and U.S. Pat. No. 4,815,915 of Crupi describes an auxiliary tow for a truck which tows a vehicle by engaging its frame.

Moreover, U.S. Pat. Nos. 3,434,607 and 3,434,608 of Nelson describe stationary wheel lift assemblies. However the prior art does not describe a wheel lift device having a pair of hydraulically rotatable swivel arm scoops which support the wheels of a disabled vehicle, wherein the swivel arm scoops are also laterally movable parallel to the axis of a cross beam extending transverse to the longitudinal axis of the tow truck itself.

In contrast to the aforementioned prior art, Applicant's U.S. Pat. No. 6,139,250 provides cross bar slider arms that automatically move laterally perpendicular to the axis of the support beam extending out from the back of the truck at the same time that tapered wheel lifting swivel arm scoop claws are hydraulically activated.

The present invention improves upon the technology of my issued '250 patent, by addressing the unique problems of towing front wheel drive vehicles, which have complex and sensitive drive machinery and reservoirs near the axle of the front wheels being lifted for towing.

OBJECTS OF THE INVENTION

It is an object of the present invention to provide a wheel lift tow device with a centrally located extendable support beam having a telescoping cross beam pivotably attached to it, so that it can conveniently tow disabled cars, especially front wheel drive motor vehicles.

It is another object to provide a wheel lift tow device with lateral movement for a pair of swivel arm scoops, or claws, which cradle and lift a pair of wheels of the disabled vehicle without damaging drive machinery of a front wheel drive motor vehicle.

It is another object to provide a wheel lift tow device which supports the lateral forces of the wheel while in the cradled position and distributes the weight therefrom, and which strengthens the claws of the swivel arm scoops supporting the weight of the vehicle, by bracketing the claws, which support the weight of the vehicle thereon, and by supplying a resting flange which extends outward below the support arm of the swivel arm scoop claw being supported thereon.

It is another object to provide a wheel lift tow device that protects the movement activators, such as hydraulic cylinders, which automatically move cross bar slider arms laterally while the arms engage a tire sidewall and automatically stop, thus allowing the second cross bar slider arm to extend further and seek out the remaining tire of a non-centered disabled vehicle.

It is yet another object to provide a wheel lift tow device which prevents damage to the oil pan of the disabled vehicle and to the wheel lift device itself.

It is yet another object to provide a wheel lift tow device which accommodates vehicles with various sized wheels and wheelbases, without utilizing portable adapters.

It is yet another object to insure that the swivel arm claw of the wheel lift tow device stays in place while towing a disabled vehicle.

It is yet another object to provide a wheel lift tow device, which accommodates smooth movement in its longitudinal movement away from a tow truck body.

It is yet another object to provide a wheel lift tow device, which enables a tow truck to alternatively use a conventional tow bar with sling and toggle for heavier disabled vehicles when use of a wheel lift is contraindicated.

It is yet a further object to improve over the disadvantages of the prior art.

SUMMARY OF THE INVENTION

In the present invention, a centrally located extendable support beam has a pivotably attached cross bar with telescoping slider arms, so that it can be oriented obliquely for towing obliquely placed disabled cars. The telescoping slider arms of the cross bar provide lateral movement for a pair of swivel arm scoops, or claws, which cradle and lift a pair of wheels of the disabled vehicle.

The swivel arm scoop claws are rotatable about a pivot adjacent to the telescoping swivel arms of the cross bar, but in their position of use are supported by a lateral stop bracket, which supports the lateral forces of the wheel while in the cradled position and distributes the weight therefrom.

The swivel arm claws are powered by movement actuators, such as hydraulic cylinders or other pneumatic or electromechanical actuators, worm gears, etc., as are known to those skilled in the art. The movement actuators are preferably placed forward of the telescoping cross beam, but are protected between upper and lower plates to prevent damage to the oil pan of the disabled vehicle and to the cylinders themselves. By "forward" the term means the distal outer portion of the tow device closest to the disabled vehicle. Therefore, the "forward" position is behind the "rearward" position with respect to the actual front of the tow truck. Preferably, to accomplish both lateral and rotatable movement of each swivel arm claw each hydraulic cylinder moves obliquely with respect to the longitudinal axis of the cross bar, to push each swivel arm scoop claw outward as the cylinder rotates each swivel arm claw.

The cross bar swivel pin is a hollow threaded bolt, to facilitate the distribution of grease therebetween.

Alternatively, the hydraulic cylinders can be located rearward of the cross bar, i.e. away from the distal outer position of the tow device closest to the disabled vehicle.

To accommodate vehicles with various sized wheels and wheel bases, the distal end member of the V-shaped swivel arm claw is tapered in shape, and extends at a tapered obtuse angle from the proximal end arm of the swivel are scoop claw, which proximal arm is pivotably attached adjacent to the respective telescoping swivel arm of the cross bar.

To insure that the swivel arm claw stays in place before being extended laterally out from the central pivot of the cross beam meeting the central support beam coming from the tow truck, a retaining means, such as an internally placed spring, is located within the hollow telescoping swivel arms of the cross bar. Outward extending fasteners, such as nuts, securing the internally placed biasing spring, may be recessed at the ends of the cross bar, to prevent damage to adjacent objects.

Optionally another type of biasing means can be used, such as another hydraulic cylinder.

Furthermore, the hydraulic hose has slack in its position of storage at rest, to accommodate smooth movement of the telescoping support beam in its longitudinal movement away from the tow truck body.

Finally, in a position of rest, the wheel lift mechanism is lifted up by the pivoting of the central support beam, and the swivel arm scoop claws are held at an angle, so that there is a space between them for movement of the conventional telescopic wrecker crane boom extension therebetween. This enables the tow truck to alternatively use a conventional tow bar with sling for heavier disabled vehicles for which use of a wheel lift is contraindicated.

For lifting front wheel drive vehicles with complex drive machinery and reservoirs near the front end axle of the wheels to be lifted, in an alternate embodiment, the pivot point for the movement actuators, such as a pair of hydraulic cylinders, is positioned further rearward with respect to the forward distal end of the lifting swivel arm scoop claws. That is, in conjunction of the definition of "forward" and rearward" as noted before, by "rearward" it is meant that the pivot point is closer to the front of the tow truck and farther away from the "forward" distal end of the wheel lift at the back of the tow truck.

At the same time, a spreader is provided between the laterally moving slider arms of the lifting swivel arm scoop claws and the wheel-accommodating wedge plate, thereby positioned the vehicle more forward (i.e. towards the distal end). This positions the front wheel drive machinery and reservoirs back further away from the moving movement actuators, such as the hydraulic cylinders. A further protection for the hydraulic cylinders themselves is the optional positioning of the cylinders within a channel sleeve, with one or more openings at one end to accommodate movement of the hydraulic cylinders therethrough.

To strengthen the load-bearing swivel arm scoop claws, a widened lower resting flange is optionally provided on a stop bracket, stopping movement of the swivel arm scoop claws in the tire-engaging position.

Moreover, to hold the movement actuators, such as the, hydraulic cylinders, when not in use, optional brackets, such as crescent shaped eye stop brackets, stabilize the resting position of the swivel arm scoop claws when stored and not in use.

In addition, to accommodate flat tires of a disabled vehicle, a further spreader wedge is attached to a distal arm of each swivel arm scoop claw opposite to the spreader, thereby reducing the space therebetween.

DESCRIPTION OF THE DRAWINGS

The present invention can best be understood in connection with the accompanying drawings, in which:

FIG. 4 is a side elevational view of the hose slack adjuster portion of the present invention;

FIG. 5 is a side elevational view of the hose slack adjuster as in FIG. 4, shown in an extended position with arrows indicating the direction of extension;

FIG. 6D is a top plan view of a crossbar and swivel arm scoop claws as in FIGS. 6A–6C, wherein the cross bar includes a wide U-shaped channel sleeve yoke, enclosing the pivot point for respective hydraulic cylinders, controlling movement of the swivel arm scoops; wherein the swivel arm scoops are shown in a storage position of rest;

FIG. 7 is a top plan view of the wheel lift of the present invention wherein the left swivel arm scoop claw portion is shown pivoting as indicated by the arrows therein;

FIGS. 11, 12, 13, 14, 15 and FIG. 16 are close up perspective views of the hydraulic telescopic boom extension, anchor leg and alternate sling set up and deployment thereof;

DETAILED DESCRIPTION OF THE PREFERRED EMBODIMENTS

Figure 1:
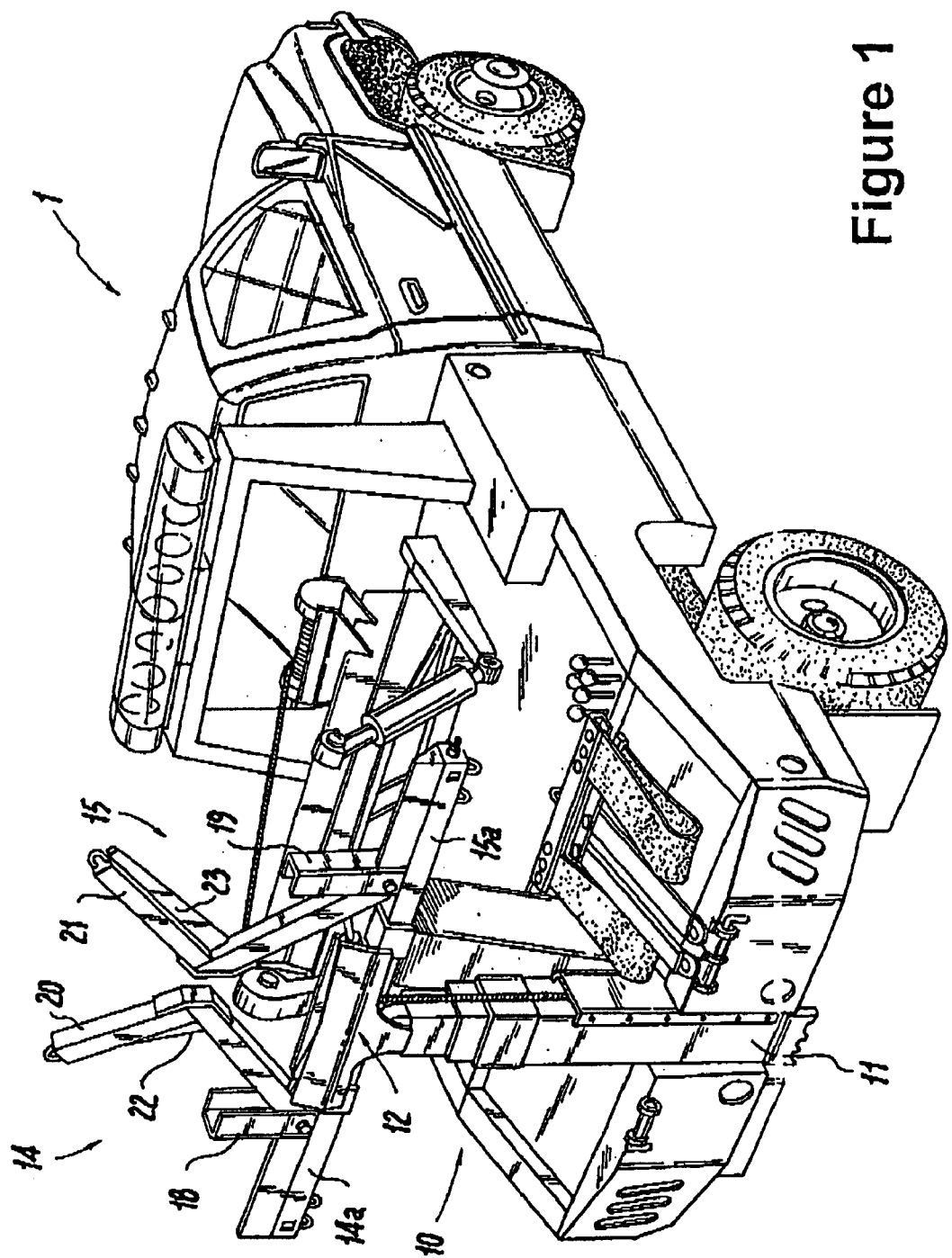
FIG. 1 is a rear perspective view of a wrecker type vehicle shown with the present invention in a boom up stored travel position.

FIG. 1 shows a wrecker truck 1 having the wheel lift mechanism 10 of the present invention which includes a telescoping central support beam, such as probe extension arm 11, slidably attachable to yoke portion 12, wherein yoke portion 12 has extending laterally on both sides wheel lifts 14, 15. Each wheel lift 14 or 15 includes at least one laterally movable telescoping slider arm, such as a pair of laterally movable telescoping slider arms, such as hollow slider arms 16, 17, having extending therefrom a swivel arm scoop claw support, such as open support bracket 18, 19 holding a swivelable arm tire engaging claw, such as pivotable angled claw member 20, 21.

Claw arm members 20, 21 each include a tire engaging portion, such as distal tire plates 22, 23, which are preferably upwardly slanting and basically triangular in configuration. Therefore, the actual angle of each swivel arm scoop claw member 20, 21 does not have a perpendicular "L" shape, but rather an oblique angled shape for securing each claw member 20, 21 underneath each respective vehicle tire of the vehicle to be towed. Each distal tire plate 22, 23 is preferably slanted, wherein proximal portions 20a, 21a of each claw arm number 20, 21 are attached to the laterally movable slider arms, such as hollow slider arms 16, 17, by pins 24, 25, although other fastenings may be used.

The purpose of each claw support, such as claw brackets 18, 19 is to provide further support when each claw arm member 20, 21 is in the extended position engaging with each respective tire of the vehicle to be towed.

Claw members 20, 21 are moved by a force importing mechanism, such as a pair of hydraulic cylinders 27, 28, having piston rods 27a, 28a therein, namely, upper hydraulic cylinder 27, and lower hydraulic cylinder 28, which are basically kept from damage by being placed between upper and lower cover plates 12a, 12b over yoke 12. Preferably upper cover plate 12a is inserted into cross bar 12d or swivel pad 12e of yoke 12 by a fastener, such as threaded zerked grease fitting swivel bolt 12c, to facilitate rotational movement of wheel lift mechanism 10. Probe extension arm 11 may have attached to it force imparting connectors, such as hydraulic lines 26a, 26b for providing compression for force imparting mechanisms, such as hydraulic cylinders 27, 28.

Hydraulic lines 26a, 26b may have a slackening mechanism as shown in FIGS. 4 and 5, so that they can smoothly move. Each slackening mechanism includes a pair of pulleys 29a, 29b, wherein one pulley 29a is attached to a coil spring 30, which coil spring 30 is then further attached to extension probe arm 11.

There are further lateral tension members, such as coil springs 31, 32 which are attached within each hollow slider arm 16, 17 of wheel lifts 14, 15, to facilitate the lateral movement of claws arm members 20, 21 and provide tension therewith. Each lateral coil spring 31, 32 is preferably attached by threaded hook 33, 34 to a respective end plates 35, 36 wherein each respective end plate 35, 36 is welded to respective hollow slider arms 16, 17 of wheel lifts 14, 15. Threaded hooks 33, 34 preferably have respective longitudinally extending rods 33a, 34a, which include respective spring retainers 33b, 34b, such as nuts. As shown in the alternate embodiment of FIG. 6A and FIG. 6C, to protect the tires of the towed vehicle from being damaged by the nut 33b or 34b, while the swivel arm scoop claws 122, 123 are being adjusted to the towing position, fasteners, such as rods 33a, 33b and fastener nuts 33b, 34b, are recessed within respective hollow slider arms 116, 117.

To further hold the tires, each hollow slider arm 16, 17 contains a respective oblique slanted portion 16a, 17a, slanting up from the horizontal, from the ground level, to the top of each hollow slider arm 16, 17 to prevent forward movement of the tire. Optionally, each oblique slanted portion 16a, 17a can be advanced forward from each hollow slider arm 16, 17 by a spacer (not shown) between same so that yoke portion 12 does not engage an oil pan of the vehicle being towed.

As also shown in FIG. 1, probe extension arm 11 is shown in stored travel position. When probe extension arm 11 is lowered to a vehicle engaging position as in FIG. 2, claw arm members 20, 21 are rotated as indicated by the arrows "A", "B". Furthermore, yoke 12 is pivotably movable clockwise or counter clockwise, as indicated by arrow "C", to facilitate oblique mounting of a set of vehicle tires upon wheel lifts 14, 15.

Figure 2:
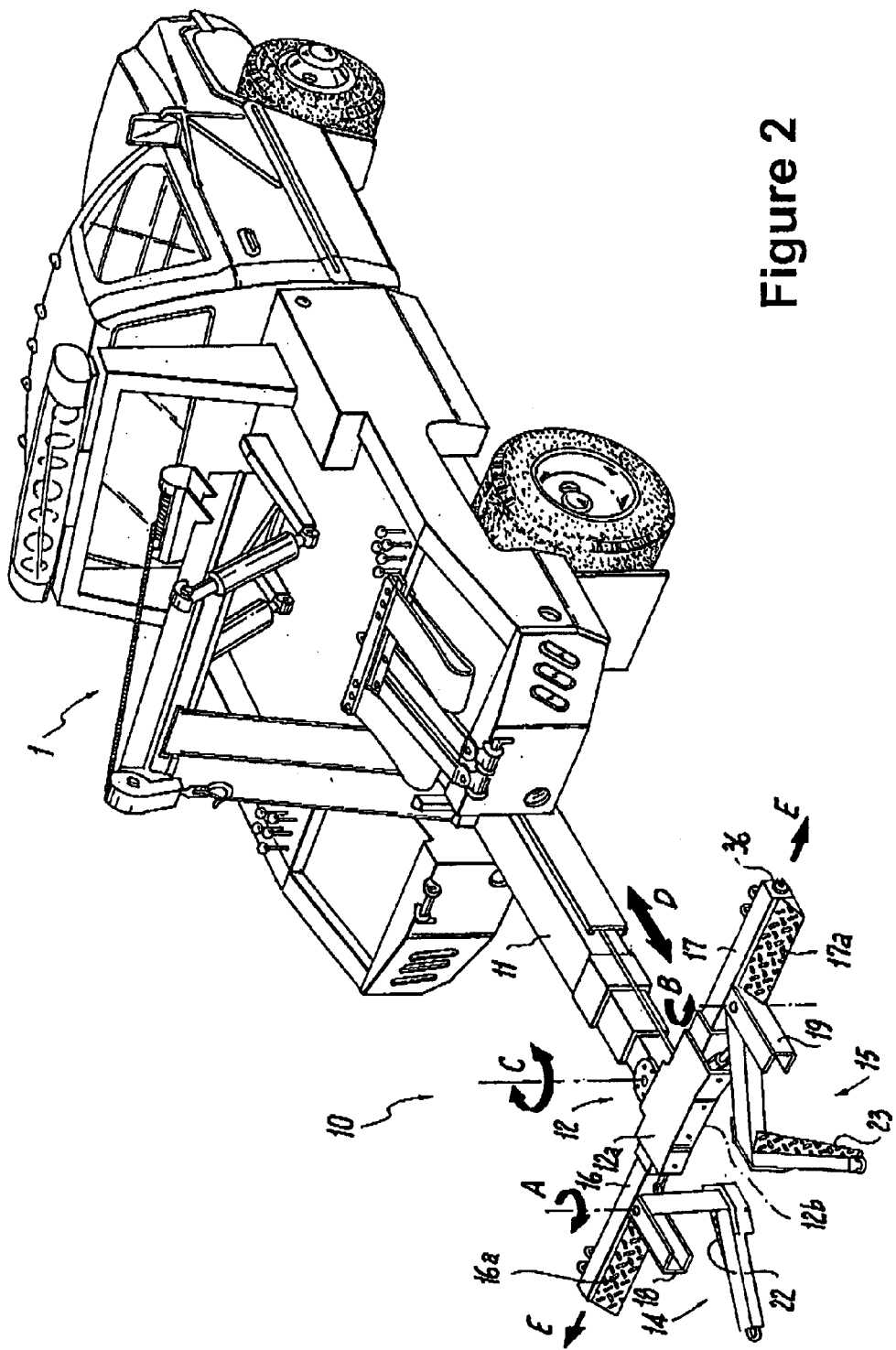
FIG. 2 is rear perspective view as in FIG. 1 in a boom down position, wherein the range of motion is shown in phantom of the lateral movements of the wheel pick up elements.
Figure 3:
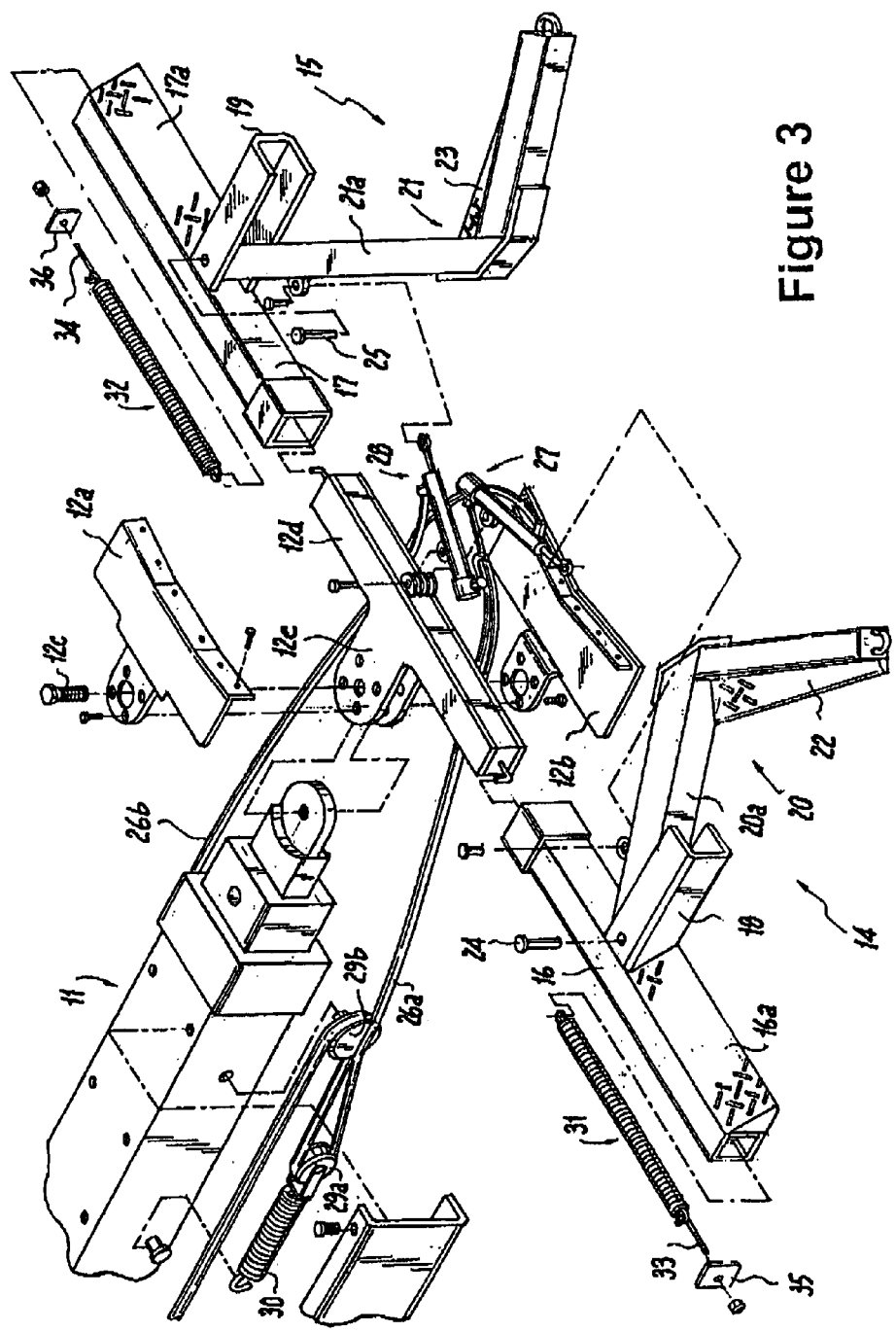
FIG. 3 is an exploded perspective view of the components of the wheel lift of the present invention.

FIG. 2 also shows directional arrow "D" to indicate the linear "in and out" movement of probe extension arm 11, to move wheel lifts 14, 15 underneath the tires of a vehicle to be towed. FIG. 2 also shows directional arrows "E" to indicate the lateral sideways "in and out" movement of hollow slider arms 16, 17.

FIGS. 6–9 show the movement of claw arm members 20, 21, wherein swivel arm scoop claw arm members 20, 21 are first pivoted and then moved in place against the tire.

Figure 8:
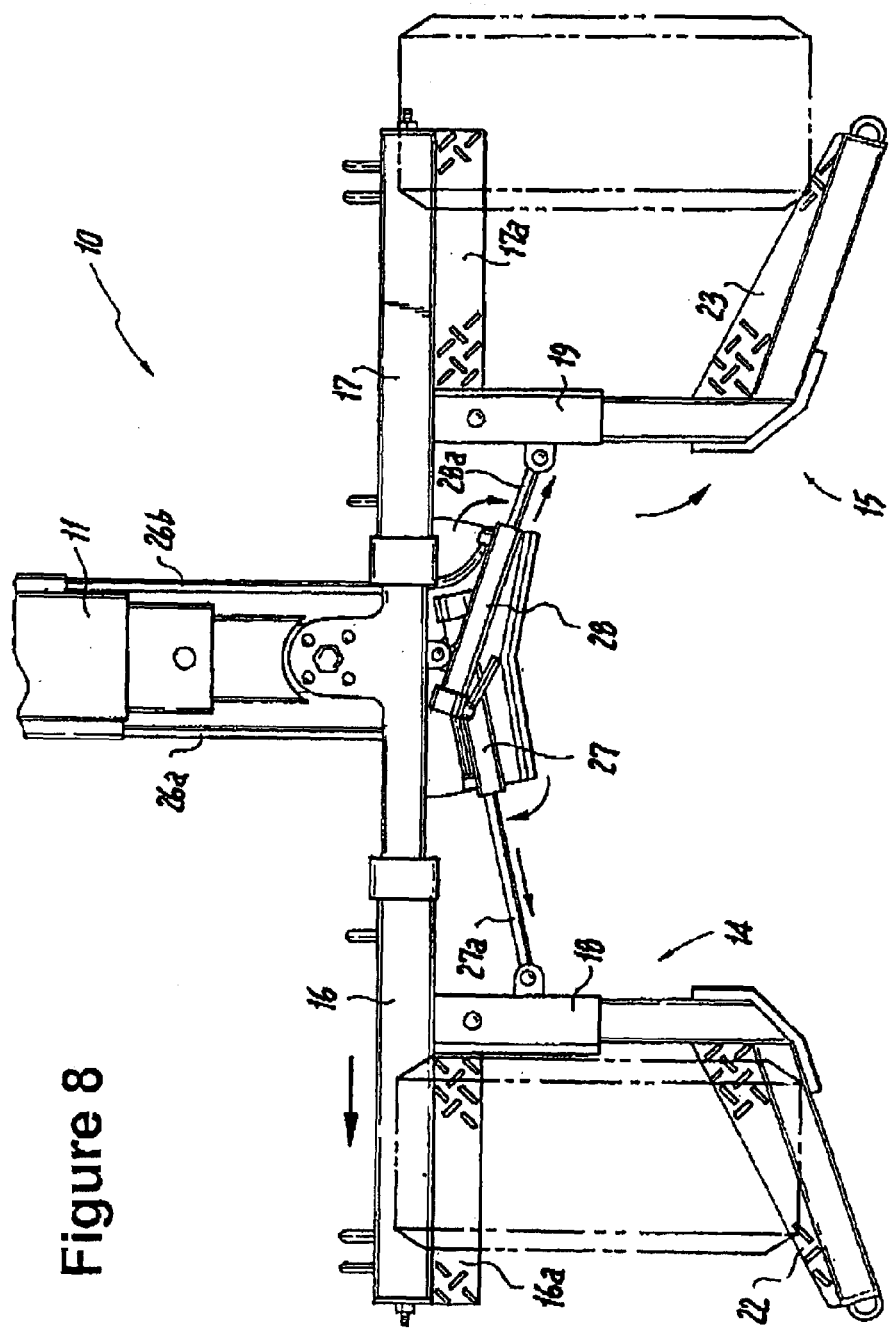
FIG. 8 is a top plan view of the wheel lift of the present invention wherein the left swivel arm scoop claw is shown deployed to the tire and the right portion is shown pivoting before engagement.

FIGS. 7 and 8 further show piston rods 27a, 28a of hydraulic cylinders 27 and 28, each movable independent of each other so that respective distal tire plates 22 and 23 of respective swivel arm scoop claw members 20 and 21, engage respective tires of the disabled vehicle.

As also shown in FIG. 8, hydraulic cylinder piston rods 27a and 28a can stop independent of each other when each hydraulic cylinder piston rod 27a or 28a engages a respective tire of the disabled vehicle, as the respective telescoping slider arms 16, 17 move laterally outward. This results in the disparate extension lengths of hydraulic cylinder piston rods 27a, 28a shown in FIG. 8.

Figures 9, 10:
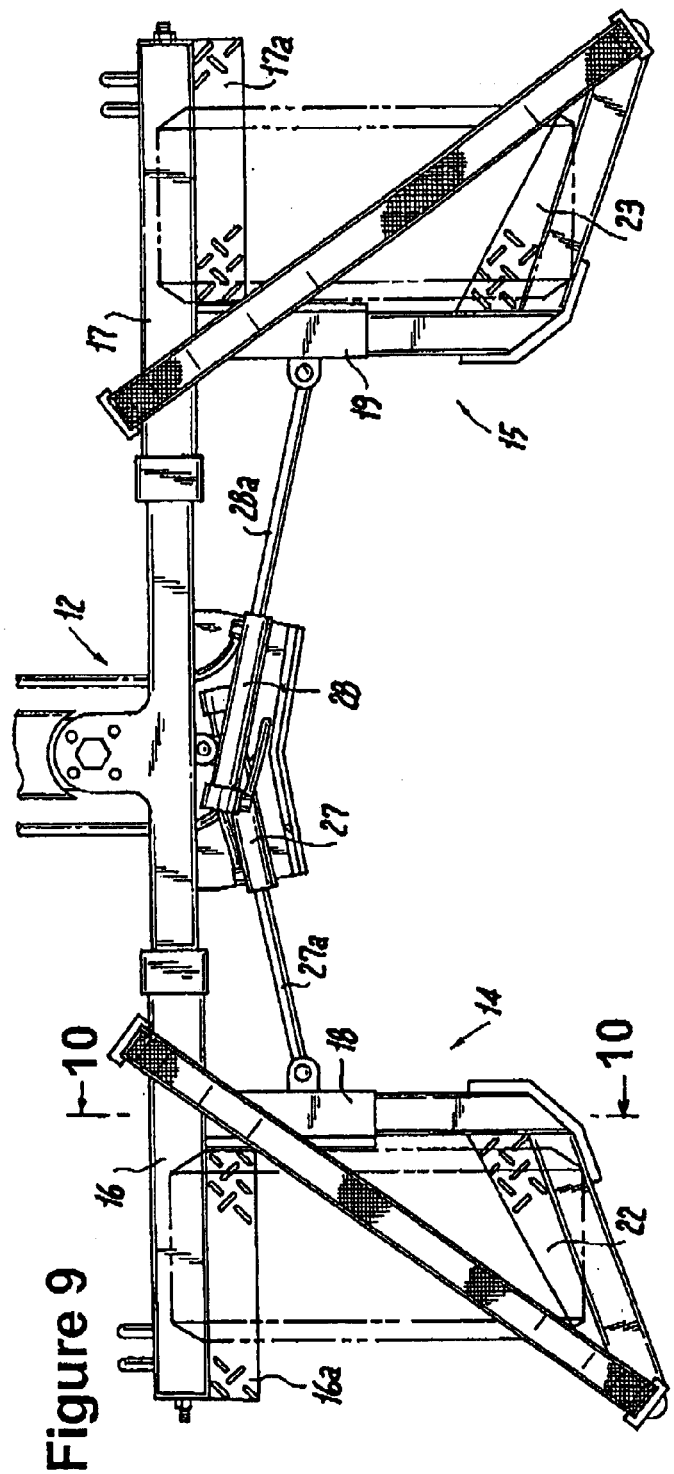
FIG. 9 is a top plan view showing the left swivel arm scoop claw contacting the tire and the right swivel arm scoop claw contacting the other tire, wherein portable wheel restraint straps are shown in place.
FIG. 10 is a close up cross sectional view of the right swivel arm scoop claw contacting a tire, taken along lines "10—10" of FIG. 9.

As shown in FIG. 9, the safety straps are manually y applied for additional safety.

Figure 11:
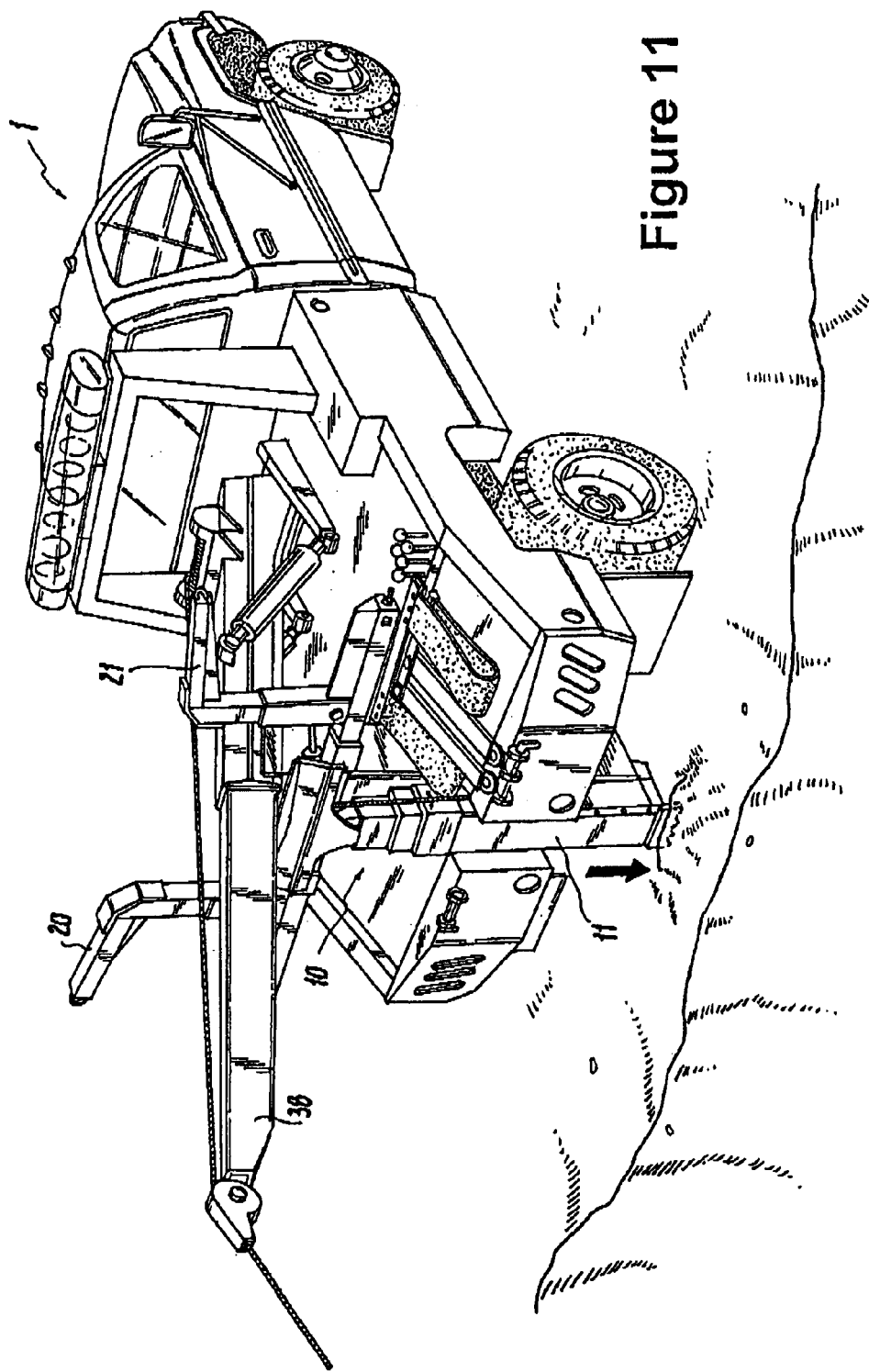
Figure 12:
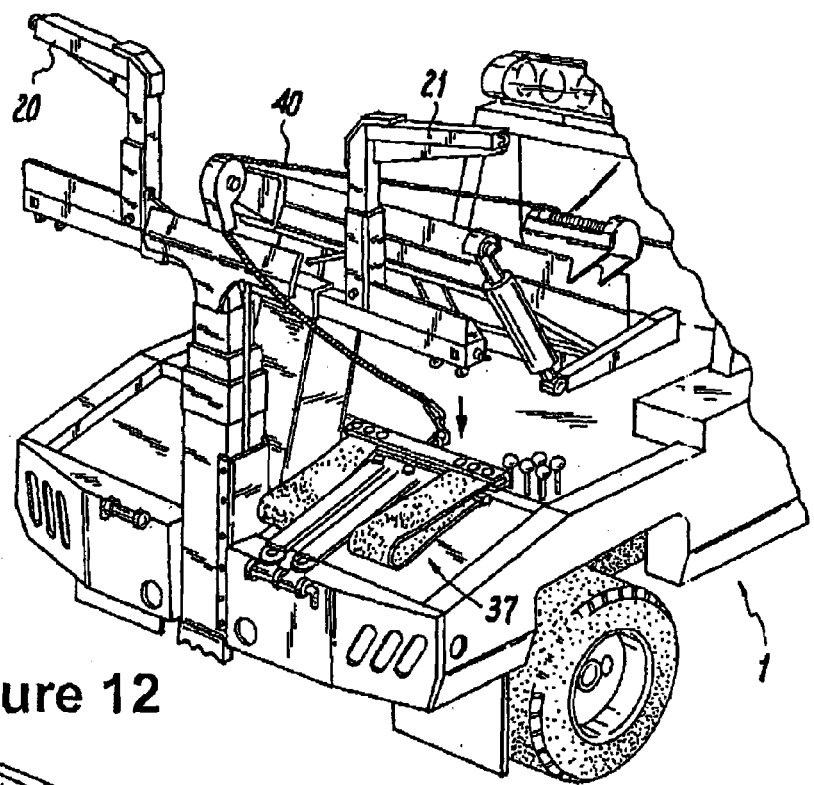
Figure 13:
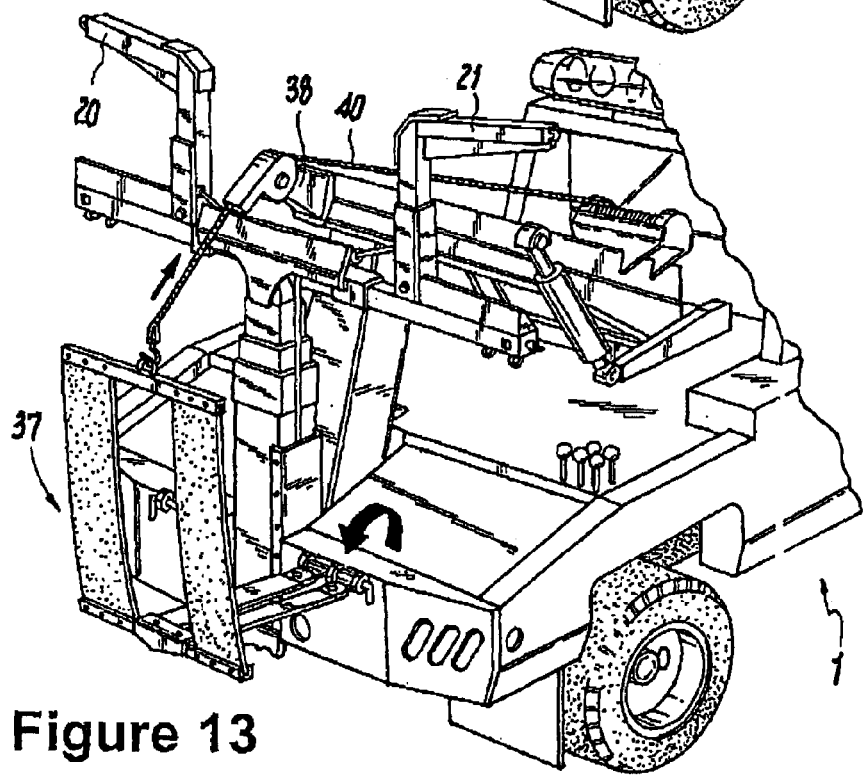

In FIG. 11 there is shown hydraulic telescopic wrecker crane boom extension 38 for vehicle retrieving purposes. When wrecker crane boom extension 38 is used, then wheel lift apparatus 1 can be lowered in its vertical stored position to the ground, so that the anchor plate at a rear portion of probe extension arm 11 contacts and anchors to the ground for stability.

Even as claw arm members 20, 21 are stored vertically in the retracted position, as in FIG. 1, then boom extension 38 can move freely therebetween.

In FIG. 12-16 there is shown an alternate sling apparatus 37 supported by a conventional telescopic wrecker crane boom extension extending upward for the tow truck body of tow truck 1 attached to the truck vehicle 1 which can be used for heavier lifts with a conventional hook up.

FIGS. 14 and 15 show the further details close up views of the sling deployment mechanism. Sling apparatus 37 attached to the deck of the vehicle 1 by attaching winch cable 40. By partially extending wrecking crane boom 38 between and through stored swivel arm scoop claw arm members 20, 21, winch cable 40 can then be attached to tow sling apparatus 37 normally stored on the wrecker body deck.

In FIG. 14, 15 by partially releasing the tension lock pin 41, one arm of the sling apparatus 37 will be released and freely extended to opposite bracket 42, without wheel lift apparatus obstructing the use of the sling apparatus 37.

Figure 6:
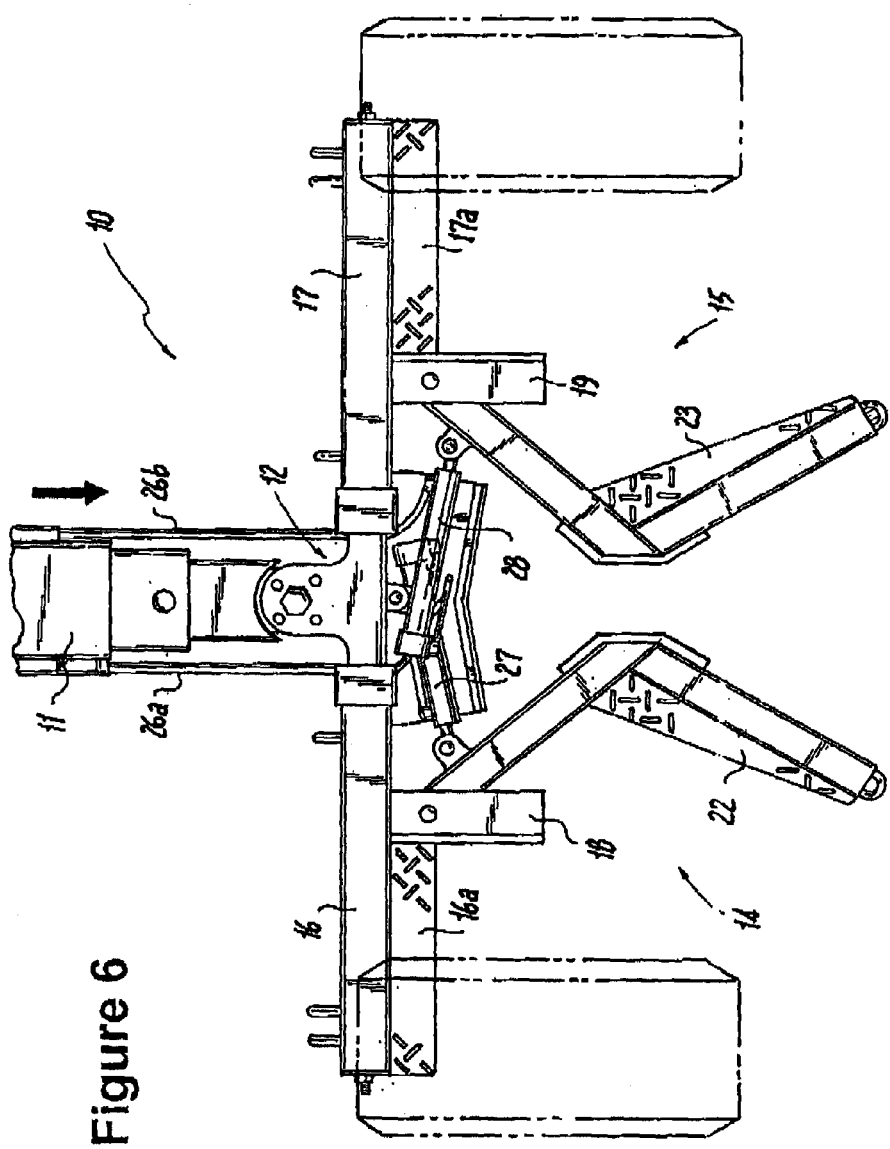
FIG. 6 is a top plan view of the wheel lift of the present invention shown in an undeployed position, wherein tires to be engaged are shown in dotted lines for environmental purposes only.
Figure 6A:
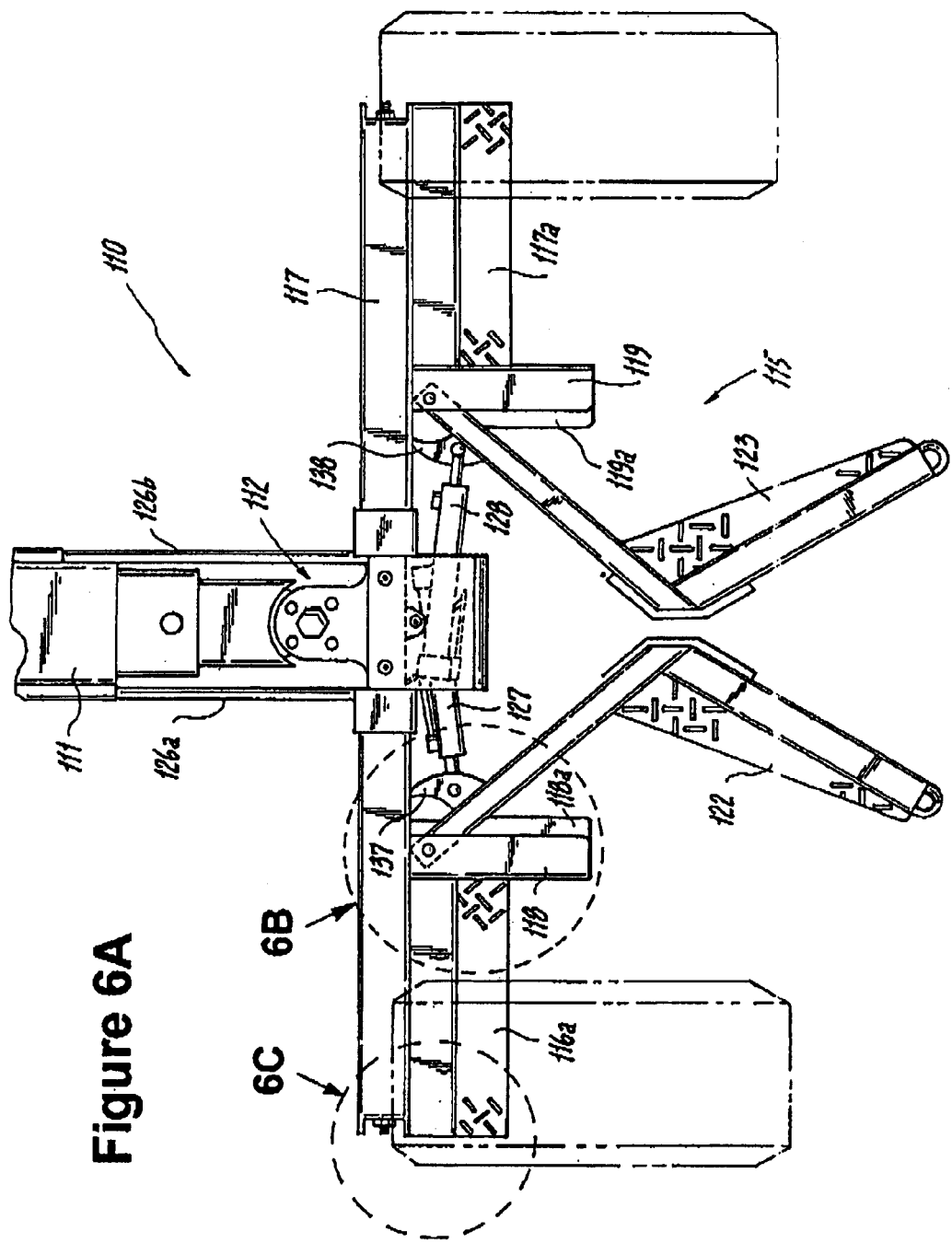
FIG. 6A is a top plan view of an alternate embodiment for a wheel lift, shown in an undeployed position, wherein the tires to be engaged are shown in dotted lines for environmental purposes only.
Figure 6B:
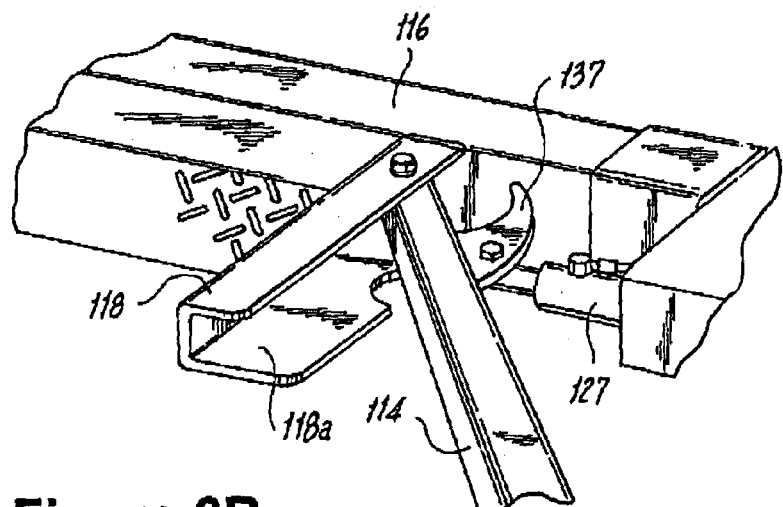
FIG. 6B is a local perspective view of a crescent shaped eye stop bracket and open support bracket for stopping and supporting a swivel arm scoop claw alternatively in positions of rest and use.

In the alternate embodiment of FIG. 6A, wheel lift apparatus 110 operates in a similar configuration and manner as wheel lift apparatus 10 of FIG. 6. For example, central support beam 111 supports cross bar 112 at a distal end thereof. Each wheel lift swivel arm scoop such as claws 114 and 115, includes at least one laterally movable telescoping slider arm, such as slider arms 116, 117, having extended therefrom respective wheel lifting swivel arm scoops 114, 115. As shown in FIGS. 6A and 6B "J" or "V" shaped claws 122, 123 of swivel arm scoops 114, 115 pivot from respective open support brackets 118, 119. Other elbowed configurations (not shown) are useful for the swivel arm scoop claws.

FIGS. 6A and 6B show lower flange extensions 118a, 119a on open support brackets 118, 119, which extend outward more than the upper flange of open support brackets 118, 119 to give additional load support to the claw arms of swivel arm scoops 114, 115.

FIGS. 6A and 6B also show eye stop brackets 137, 138; such as for example, of arcuate shapes, which stop and stabilize swivel arm scoops 114, 115 in place in a storage position of rest against portions of telescopic crossbar arms 116, 117.

To move the disabled vehicle farther away from moving actuators 127, 128, such as hydraulic cylinders, slanted wheel-engaging surfaces 116a, 117a of telescopic slider arms 116, 117 are wider than wheel engaging surfaces 16a, 17a shown in the embodiment of FIG. 6. This moves the wheels of the vehicle and thus its front wheel drive machinery, further away from moving movement actuators 127, 128, such as hydraulic cylinders.

FIG. 6A also shows power sources 126a, 126b, such as hydraulic fluid lines, for hydraulic cylinders 127, 128.

Figure 6C:
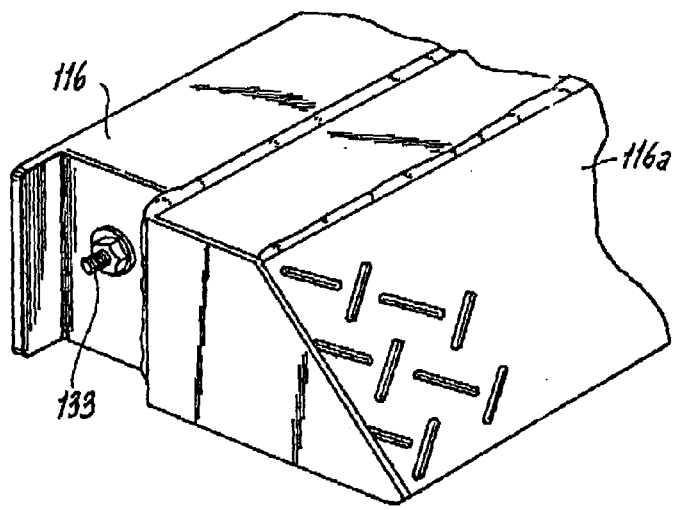
FIG. 6C is a local close-up perspective view of a wider wedge plate for engaging a tire of a disabled vehicle, including a recess provided in the wider wedge plate, which accommodates a recessed fastener attached to an internal lateral tension spring for a swivel arm scoop claw.

FIG. 6C shows spreader blocks 116 with slanted wheel-engaging surfaces 116a.

Figure 6E:
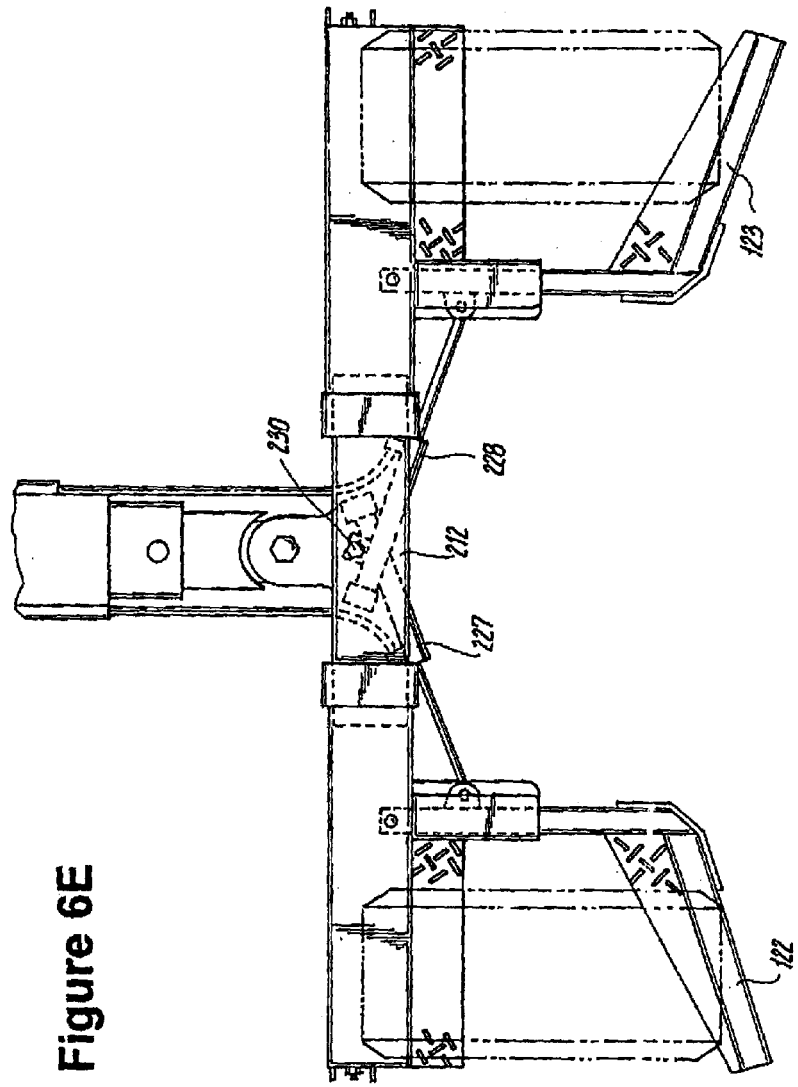
FIGS. 6E is a top plan view of the hydraulic cylinder assembly as in FIG. 6D, shown in a position of use about a pair of tires of a disabled vehicle.

In yet another embodiment for separating the movement actuators away from the front wheel drive machinery of the vehicle being towed, as shown in FIG. 6D and 6E, the pivot point of movement actuators 227, 228 is located inward away from the vehicle to a more inward pivot point "P" away from the location of the pivot point as in FIG. 6.

Figure 6F:
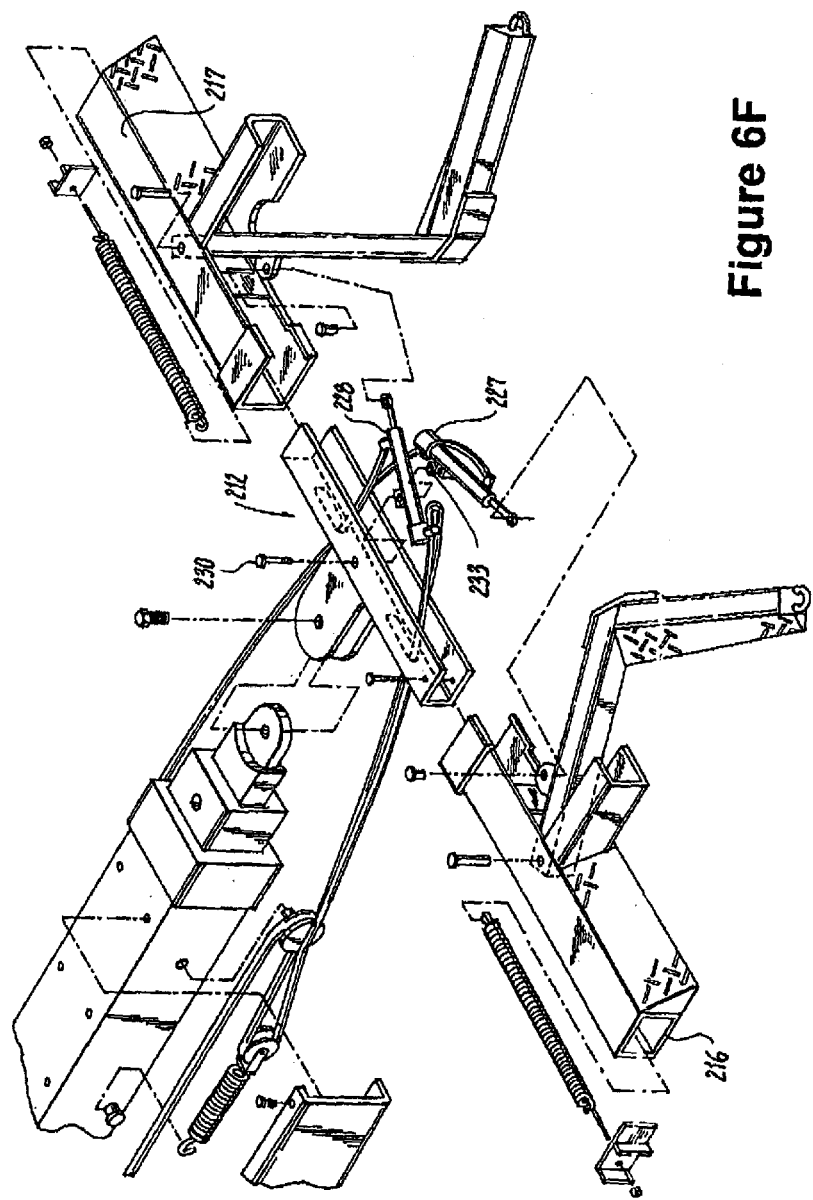
FIGS. 6F is an exploded perspective view of the wheel lift as in FIGS. 6D and 6E.

In order to further protect the cylinders 227, 228 in FIG. 6D, 6E and 6F, they are covered by a wide channel sleeve yoke 212. Yoke 212 has top and bottom surfaces connected by a common rear wall.

FIGS. 6D, 6E, 6F and 6H and 6I further shows hydraulic cylinders 227, 228 pivoting about pin 230 extending through channel sleeve yoke 212 of FIG. 6D. Pin 230 extends through upper and lower wall 212a, 212b of yoke 212, bearing plates 231, 232 extending there from, and through joint blocks 227a, 228a of hydraulic cylinders 227, 228. Flat washer 233 separates joint blocks 227a and 228a and shines them against bearing plates 231, 232.

Figure 6G:
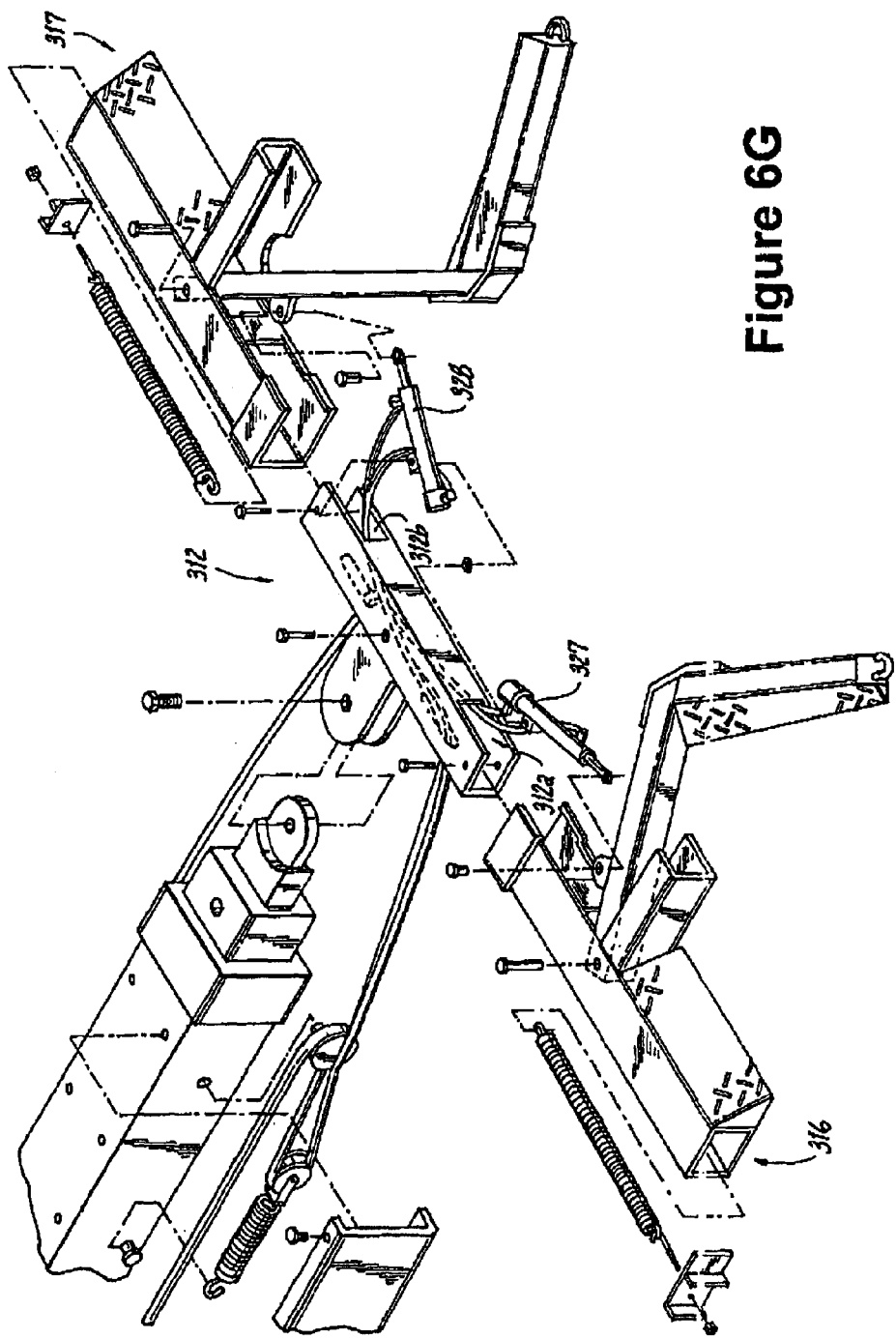
FIG. 6G is an exploded perspective view of a further alternate embodiment for a crossbar and swivel arm scoops, wherein the cross bar includes a wide tubular shaped channel sleeve yoke with windows, accommodating the respective hydraulic cylinders, controlling movement of the swivel arm scoops.
Figure 6H:
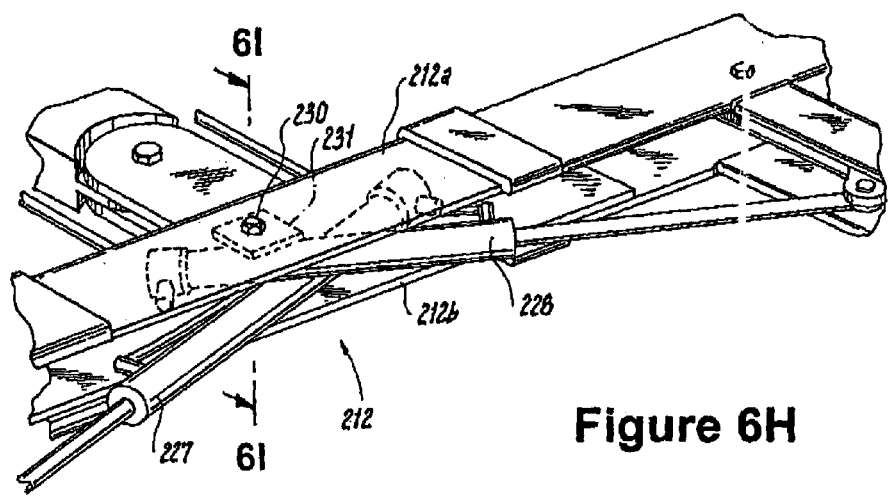
FIG. 6H is a close up perspective detail view of the hydraulic cylinder mounting of the wheel lift embodiment as in FIGS. 6D–6F.
Figure 6I:
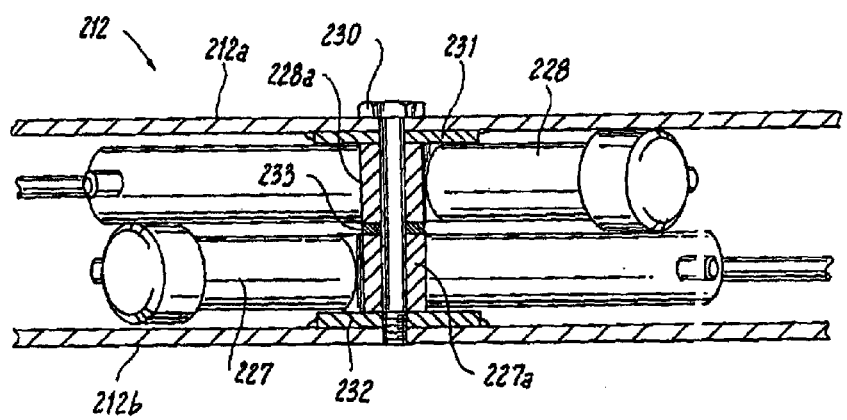
FIG. 6I is a rear elevational view in cross section of the hydraulic cylinder mounting as in FIGS. 6D–6F; taken along lines "6I—6I" of FIG. 6H.

Yoke 212 may have other configurations, as in FIG. 6G, such as with a square tubular configuration 312 with windows 312a, 312b for accommodating movement of cylinders 327, 328 therethrough, as long as yoke 312 permits movement of both telescopic arms 316, 317 and of hydraulic cylinders 327, 328 or other movement actuators.

Figure 17:
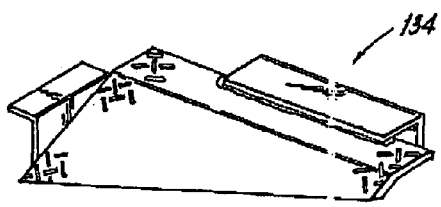
FIG. 17 is a perspective view of a wedge spreader accessory for narrowing the distance between the swivel arm scoop claw and the crossbar, for accommodating a flat tire of a disabled vehicle therebetween.
Figure 18:
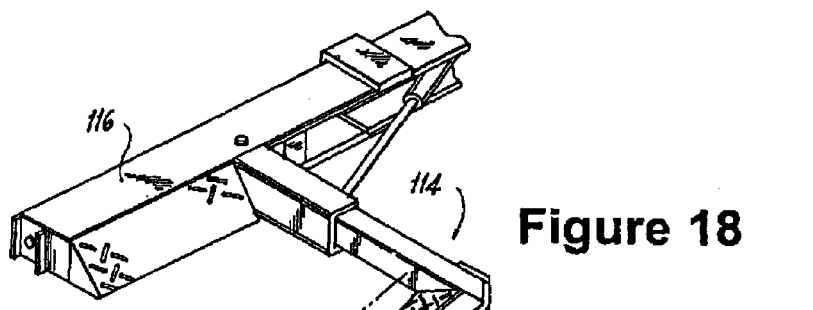
FIG. 18 is a top plan view of a portion of the crossbar and swivel arm scoop claw, with the spreader accessory wedge shown installed on the distal arm of the swivel arm scoop claw; and, FIG. 19 is a side elevational view, taken along view lines 19—19 of FIG. 18, showing the flat tire engaged by the wider wedge plate, as in FIG. 6A and the wedge spreader assembly of FIGS. 17 and 18, wherein the tire being engaged is shown in dotted lines for environmental purposes only.
Figure 19:
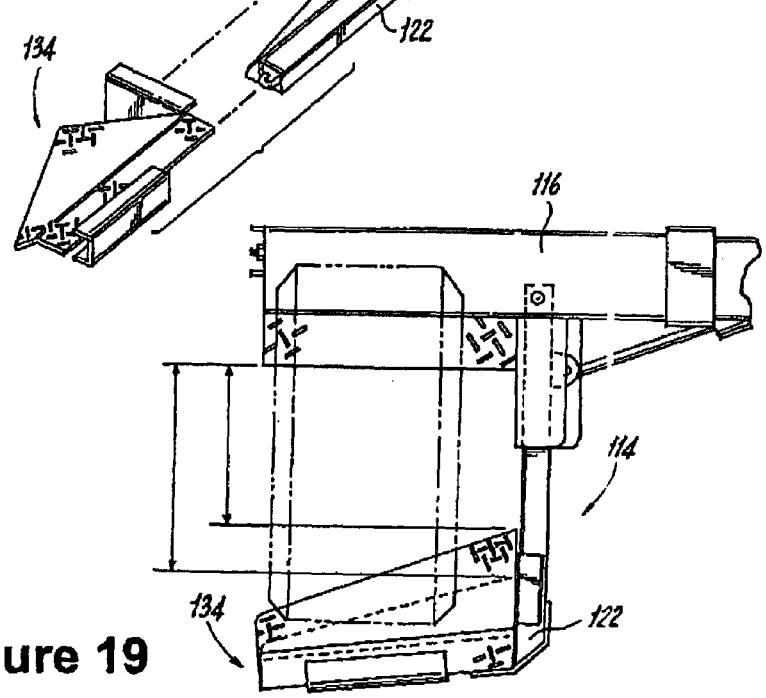

FIGS. 17–19 shows a wedge adapter sleeve 134 which slides over each claw arm 122,or 123, of swivel arm scoops 114, or 115, to provide a space and reduce the distance between the claw arms 122, 123 and slider arms 116 or 117, where small tires or flat tires are being lifted.

In the foregoing description, certain terms and visual depictions are used to illustrate the preferred embodiment. However, no unnecessary limitations are to be construed by the terms used or illustrations depicted, beyond what is shown in the prior art, since the terms and illustrations are exemplary only, and are not meant to limit the scope of the present invention.

It is further known that other modifications may be made to the present invention, without departing the scope of the invention.

I claim:

1. A wheel lift tow device of a tow truck to tow a front wheel drive vehicle having wheels that each have a tire comprising:

a centrally located extendable support beam having a free end to which is attached a cross bar, said support beam attached to said cross bar at a location between free ends of said cross bar, a yoke at said location comprising upper and lower cover plates enclosing said location, said cross bar having a pair of slider arms extending outwardly from the free ends of said cross bar and said slider arms being automatically and hydraulically telescoping laterally relative to the free ends of said cross bar, each slider arm having a forwardly directed portion adapted to engage corresponding under sides of a pair of wheels on the vehicle to be towed, a swivel arm scoop claw extending in a forwardly direction from each of said slider arms, each said swivel arm scoop claw being mounted on and rotatable about respective pivots on said laterally movable slider arms so that said swivel arm scoop claws may be moved laterally in opposite directions to adjust the distance between said swivel arm scoop claws and may be pivoted so as to engage the undersides of the pair of wheels on sides opposite front that engaged by the forwardly directed portions of said slider arms, thereby cradling the pair of wheels for lifting said vehicle, a hydraulic cylinder for powering each of said laterally movable slider arms outwardly after rotation of said claws into deployed positions with each claw engaging a tire, said claws being independently positioned, said hydraulic cylinders being employed to rotate the claws into filly deployed positions after the forwardly directed portions are placed into contact with one side of the tire, wherein upon being fully deployed, said rotatable claws come into contact with brackets which extend forwardly from said arms, wherein further continued rotation of said claws against said brackets causes said slider arms to move outwardly until said rotatable claws make contact with the other side of the tire, and said forwardly directed portion of each of said slider arms being dimensioned so as to provide separation between said hydraulic cylinder and drive machinery of the front wheel drive vehicle.

2. The wheel lift tow device as in claim 1 further wherein said slider arms are dimensioned to be wider by respective spreaders separating said telescoping slider arms from slanted wheel-engaging edges of said swivel arm scoop claws.

3. The wheel lift tow device as in claim 1, wherein said claws are each supported by a lateral open support sleeve bracket when engaged with a wheel, said open support sleeve bracket supporting the lateral forces of the wheel of the vehicle while the wheels are in the cradled position and said open support sleeve bracket distributing the weight therefrom.

4. The wheel lift tow device as in claim 2, wherein each hydraulic cylinder for each said swivel arm scoop claw is located between upper and lower plates to prevent damage to the oil pan of the vehicle and to said cylinders, the hydraulic cylinders being pivoted from a common shaft and overlapping each other.

5. The wheel lift tow device as in claim 1 further comprising respective eye brackets stabilizing said respective swivel arm scoop claws in place in a storage position of rest against portions of said telescopic arms.

6. The wheel lift tow device as in claim 1 further comprising a wedge adapter sleeve which slides over each said claw arm, of each said swivel arm scoop claw to provide a space and to reduce the distance between said respective claw arms and said respective slider arms, where small tires or flat tires are being lifted.

7. A wheel lift tow device of a tow truck to tow a front wheel drive vehicle having wheels that each have a tire comprising:
   a centrally located extendable support beam having a cross bar pivotably attached thereto at a location on said cross bar between a pair of free ends,
   said cross bar having a pair of hydraulically controlled telescoping slider arms movable outwardly with respect to the free ends of said cross bar, each slider arm having pivotably mounted thereon a rotatable swivel arm scoop claw;
   each said swivel arm scoop claw having a portion thereof adapted to engage the underside of one of the wheels on the vehicle and being movable between a first position where said portion is retracted away from the wheels and a second position where said portion engages one of the wheels,
   each said slider arm having a lateral U-shaped support bracket with a horizontal opening into which said swivel arm scoop claw nestles when said scoop claw is fully deployed for providing sufficient additional support to said claws to lift the vehicle when said swivel arm scoop claws are moved into said second position, said U-shaped support bracket having a bottom flange extension and a top flange extension, the bottom flange extension extending out further than said top flange extension in order to give additional load support to the claw arms of the swivel arm scoops,
   a hydraulic cylinder for powering each of said swivel arm scoop claws,
   said cross bar having means to engage corresponding undersides of a pair of wheels opposite to the sides of the wheels engaged by said claws on the vehicle to be towed and insure separation of each said hydraulic cylinder and drive machinery of the front wheel drive vehicle, and,
   said hydraulic cylinders being employer to rotate the claws into fully deployed positions after the forwardly directed portions are placed into contact with one side of the tires, wherein upon being deployed, said rotatable claws come into contact with brackets which extend forwardly from said slider arms, wherein further continued rotation of said claws against said brackets causes said slider arms to move outwardly until said rotatable claws make contact with the other side of the tires.

8. A wheel lift tow device of a tow truck to tow a front wheel drive vehicle having wheels that each have a tire comprising:
   a centrally located extendable support beam having a free end to which is attached a cross bar,
   said support beam attached to said crossbar at a location between free ends of said cross bar,
   a yoke enclosing said location,
   said cross bar having a pair of slider arms extending outwardly from the free ends of said cross bar and said slider arms being automatically and hydraulically telescoping laterally relative to the free ends of said cross bar,
   each slider arm having a forwardly directed portion adapted to engage corresponding under sides of a pair of wheels on the vehicle to be towed,
   a swivel arm scoop claw extending in a forwardly direction from each of said slider arms to engage one side of a one wheel of the pair of wheels wheel;
   each said swivel arm scoop claw being mounted on and rotatable about respective pivots on said telescoping slider arms having a rearwardly extending scoop claw to engage an opposite side of the wheel when said swivel arm scoop claw is in a fully deployed position, said scoop claw being rotatable between said fully deployed position and a retracted position away from the wheel,
   means extending forwardly from each said slider arm for being engaged by a fully deployed swivel arm scoop claw to adjust the distance between said swivel arm scoop claw and the forwardly direction portion of each slider arm so as to cradle each tire,
   a hydraulic cylinder for powering each of said laterally movable slider arms outwardly after rotation of said swivel arm scoop claws come into contact with said forwardly extending means until contact is made with the tires,
   said forwardly directed portion of each of said slider arms being positioned so as to provide separation between said hydraulic cylinder and drive machinery of the front wheel drive vehicle, and,
   said hydraulic cylinders being employed to rotate the claws into fully deployed positions after the forwardly directed portions are placed into contact with one side of the tires, wherein upon being fully deployed, said rotatable claws come into contact with brackets which extend forwardly from said slider arms, wherein further continued rotation of said claws against said brackets causes said slider arms to move outwardly until said rotatable claws make contact with the other side of the tires.

9. The wheel lift tow device as in claim 8 wherein said hydraulic cylinders have a common pivot point of movement away from the vehicle being towed.

10. The wheel lift tow device as in claim 8 wherein said hydraulic cylinders are covered by a wide channel sleeve yoke, permitting movement of both said telescopic arms and both of said hydraulic cylinders.

11. The wheel lift tow device as in claim 8 wherein said yoke is U-shaped, with an open side to accommodate movement of said hydraulic cylinders therethrough.

12. The wheel lift tow device as in claim 8 wherein said yoke is a square tubular member having a pair of windows in a side thereof to accommodate movement of said hydraulic cylinders therethrough.

13. The wheel lift tow device as in claim 8 wherein said claw arms include lower flange extensions on brackets which extend outward more than an upper flange of said brackets, thereby giving additional load support to said swivel arm scoop claw arms.

14. The wheel lift tow device as in claim 8 further comprising respective eye stop brackets stabilizing said respective claws in place in a storage position of rest against portions of said telescopic arms of said crossbar.

15. A wheel lift tow device of a tow truck to tow a front wheel drive vehicle having wheels that each have a tire comprising:
 a centrally located extendable support beam having a free end to which is attached a cross bar,
 said support beam attached to said cross bar at a location between free ends of said cross bar,
 said cross bar having a pair of slider arms extending outwardly from the free ends of said cross bar and said slider arms being automatically and hydraulically telescoping laterally relative to the free ends of said cross bar,
 each slider arm having a forwardly directed portion adapted to engage corresponding under sides of a pair of wheels on the vehicle to be towed,
 a swivel arm scoop claw extending in a forwardly direction from each of said slider arms,
 each said swivel arm scoop claw being mounted on and rotatable about respective pivots on said telescoping slider arms so that said swivel arm scoop claws may be moved laterally in opposite directions to adjust the distance between said swivel arm scoop claws and pivoted so as to engage the undersides of the pair of wheels on sides opposite from that engaged by the forwardly directed portions of said slider arms, thereby cradling the pair of wheels for lifting the vehicle,
 a wedge adapter sleeve slidable over a distal end of each claw arm for engaging smaller wheels or wheels with flat tires,
 a hydraulic cylinder for powering each of said laterally movable slider arms after extending said swivel arm scoop claws into deployed positions,
 said forwardly directed portion of each of said slider arms being dimensioned so as to provide separation between said hydraulic cylinder and drive machinery of the front wheel drive vehicle, and,
 said hydraulic cylinders being employed to rotate the claws into folly deployed positions after the forwardly directed portions are placed into contact with one side of the tires, wherein upon being fully deployed, said rotatable claws come into contact with brackets which extend forwardly from said slider arms, wherein further continued rotation of said claws against said brackets causes said slider arms to move outwardly until said rotatable claws make contact with the other side of the tires.

16. A method of lifting one end of a four wheeled front wheel drive vehicle comprising the steps of:
 placing an end of a centrally located extendable support beam adjacent a an end of the vehicle to be lifted, said support beam having a free end to which is attached a cross bar, said support beam attached to said cross bar at a location between free ends of said cross bar, said crossbar having a pair of slider arms extending outwardly from the free ends of said cross bar and said slider arms telescoping laterally relative to respective free ends of said cross bar, each slider arm having a swivel arm scoop claw pivotally mounted at one end on said slider arm,
 advancing said crossbar until each said slider arm of said pair of slider arms makes contact with one side each of two adjacent wheels on said vehicle,
 using at least one hydraulic cylinder for rotating each of said swivel arm scoop claws to a fully deployed position engaging a support bracket extending forwardly from said slider arm,
 after rotating said swivel arm scoop claws to said fully deployed position, continuing to use said at least one hydraulic cylinder for using said swivel arm scoop claws to urge said support brackets to move said slider arm until said swivel arm scoop claws make contact with sides of the two adjacent wheels opposite that of contact made by said slider arms, and
 raising said support beam to lift the end of said vehicle.

* * * * *